(12) United States Patent
Palaniyappan et al.

(10) Patent No.: US 9,998,628 B1
(45) Date of Patent: Jun. 12, 2018

(54) METHODS AND SYSTEMS FOR AUTO CORRECTION OF DEFECTS IN A SCANNED IMAGE

(71) Applicant: XEROX CORPORATION, Norwalk, CT (US)

(72) Inventors: Mohan Palaniyappan, Tiruchengodu (IN); Punitha Puttuswamy, Bangalore (IN); Arindam Das, Konnagar (IN)

(73) Assignee: XEROX CORPORATION, Norwalk, CT (US)

( * ) Notice: Subject to any disclaimer, the term of this patent is extended or adjusted under 35 U.S.C. 154(b) by 0 days. days.

(21) Appl. No.: 15/477,145

(22) Filed: Apr. 3, 2017

(51) Int. Cl.
*H04N 1/40* (2006.01)
*H04N 1/387* (2006.01)
*H04N 1/409* (2006.01)
*G06T 5/00* (2006.01)

(52) U.S. Cl.
CPC .......... *H04N 1/4097* (2013.01); *G06T 5/006* (2013.01); *H04N 1/4092* (2013.01)

(58) Field of Classification Search
CPC ..... H04N 1/4097; H04N 1/4092; G06T 5/006
See application file for complete search history.

(56) References Cited

U.S. PATENT DOCUMENTS

| 5,497,236 | A | 3/1996 | Wolff et al. |
| 6,806,980 | B2 | 10/2004 | Xu et al. |
| 7,170,644 | B2* | 1/2007 | Loce ............... G06K 9/3283 358/3.26 |
| 2008/0100884 | A1* | 5/2008 | Seo ................. G06K 9/3275 358/488 |

* cited by examiner

Primary Examiner — Quang N Vo

(57) ABSTRACT

Disclosed are methods and multi-function devices for auto-correction of shadow effects in a scanned image. The method includes receiving a first image including a colored twin-page scanned document including at least one of a shadow region in a central part of the first image, at least one darker region caused at one or more borders of the first image, and distorted orientation with respect to a base of the first image; re-positioning the shadow region present in the central part to generate a re-positioned first binary image such that the shadow region becomes perpendicular to the base; detecting a shadow region in a central region of the re-positioned first binary image; removing the detected at least one shadow region from the re-positioned first binary image to generate a second image; and correcting a skewed orientation of each of a cropped left side and right side of the second image.

20 Claims, 26 Drawing Sheets

INPUT                    OUTPUT

INPUT                    OUTPUT

METHODS AND SYSTEMS FOR AUTO CORRECTION OF DEFECTS IN A SCANNED IMAGE

TECHNICAL FIELD

The presently disclosed subject matter relates to multi-function devices, and more particularly to methods and systems for automatically correcting one or more defects that get introduced in a scanned image while scanning a document.

BACKGROUND

To maintain a digital repository, digitizing of books is performed, and digitizing requires scanning of books. When the thick bound books are scanned to capture the twin-pages (both left and right pages of an open book), there are some unwanted defects, which may get introduced. These defects includes: (1) pyramid shaped darker region primarily caused at the center, where the surface of the book is not completely in contact with the scan-bed, (2) darker regions caused at the borders and corners of the book, where the page touching the scan-bed to the outer cover of the book forms a slope and also due to the gap introduced between the scan-bed and the scanner-cover plate, and (3) the orientation distortion introduced due to disproportionate distribution of the pages on either sides. If these defects remain uncorrected then a large amount lot of cartridge/toner ink is consumed when these scanned images are printed. Cartridge and toner ink are valuable resource for a printer and an efficient usage of the toner ink is a value add for any printer.

Presently, there exist a technique that attempts to classify the noises present in scanned images specifically related to horizontal line structures. Another existing technique identifies pixel locations with questionable colors in the scanned images. Another existing method eliminates border effect caused while scanning the document and cropping the book region. Yet another existing technique corrects the distortion caused along the spine of the book and warping of words in the shadow. Additional solutions correct uneven illumination and color cast problem. Other technique straightens out the text lines in scanned images and correct the perspective distortion of the characters at the binding edge or spine of the book. Moreover, other technique focuses on skew detection and correction based on a plurality of lines. Additional technique creates a uniform lighting for archival-quality but still document acquisition remains a non-trivial problem. The existing solutions solve the issues but the solutions only consider images that are free from skew and are gray scale. Also, none of the existing solutions focus on automatic correction of the defects caused while scanning the documents.

Hence, in light of the limitations with existing techniques, there arises a need for improved methods and systems for auto correction of defects in scanned images.

SUMMARY

According to aspects illustrated herein, there is provided a method for automatically correcting a plurality of shadow effects present in a scanned image. The method includes receiving, by a transceiving device, a first image comprising a colored twin-page scanned document. The first image includes at least one of a shadow region in a central part of the first image such that the shadow region is not perpendicular to the central part of the first image, at least one darker region caused at one or more borders of the first image, and distorted orientation with respect to a base of the first image. The method includes re-positioning by an image processing device, the shadow region present in the central part of the first image to generate a re-positioned first binary image such that the shadow region becomes perpendicular to the base of the first image. The method further includes detecting, by the image processing device, at least one shadow region in a central region of the re-positioned first binary image. The method includes removing, by the image processing device, the detected at least one shadow region from the re-positioned first binary image to generate a second image comprising a left side and a right side. The method further includes correcting, by the image processing device, a skewed orientation of each of a cropped left side and a cropped right side of the second image.

According to another aspect, there is provided a multi-function device for automatically correcting a plurality of shadow effects present in a scanned image. The multi-function device includes a transceiving device configured to receive a first image comprising a colored twin-page scanned document. The first image includes at least one of a shadow region in a central part of the first image such that the shadow region is not perpendicular to the central part of the first image, at least one darker region caused at one or more borders of the first image, and distorted orientation with respect to a base of the first image. The multi-function device further includes an image processing device configured to re-position the shadow region in the central part of the first image to generate a re-positioned first binary image such that the shadow region becomes perpendicular to the base of the first image. The image processing device is configured to detect at least one shadow region in a central region of the re-positioned first binary image. Further, the image processing device is configured to remove the detected at least one shadow region from the re-positioned first binary image to generate a second image comprising a left side and a right side. The image processing device is configured to correct a skewed orientation of each of a cropped left side and a cropped right side of the second image.

According to yet another embodiment of the present disclosure, there is provided a method for automatically correcting a number of shadow effects present in a scanned image. The method includes receiving a first image including a colored twin-page scanned document. The first image includes at least one of a shadow region in a central part of the first image such that the shadow region is not perpendicular to the central part of the first image, at least one darker region caused at one or more borders of the first image, and distorted orientation with respect to a base of the first image. The method includes converting the first image into a first grey scale image. The first grey scale image includes an eight-bit grey scale image. The method includes converting the first grey scale image into a first binary image having a plurality of black pixels based on a pre-defined grey threshold, the grey threshold depends on a nature of the first grey scale image. The method also includes removing text content from the first binary image by replacing the plurality of black pixels with a plurality of white pixels. The method further includes applying a dilation method for removing sporadic noise (background noise) segments to generate a dilated image. The method further includes extracting one or more edges from the dilated image to generate an edge image. The method includes determining a degree of rotation "θ" with respect to the base of the first grey scale image. A Hough line transformation method is applied for determining the degree of rotation "θ." The method further includes rotating the first image based on the degree of rotation "θ" to generate the re-positioned first binary image. A maximum returned degree of rotation "θ" is considered for rotating the first image and making the shadow region perpendicular to the base. The method includes detecting at least one shadow region in a central region of the re-positioned first binary image. The method further includes removing the detected at least one shadow region from the re-positioned first binary image to generate a second image comprising a left side and a right side. The method furthermore includes correcting a skewed orientation of each of a cropped left side and a cropped right side of the second image.

According to yet another aspect of the present disclosure, there is provided a multi-function device for automatically correcting a plurality of shadow effects (or defects) present in a scanned image. The multi-function device includes a transceiving device configured to receive a first image comprising a colored twin-page scanned document. The first image includes at least one of a shadow region in a central part of the first image such that the shadow region is not perpendicular to the central part of the first image, at least one darker region caused at one or more borders of the first image, and distorted orientation with respect to a base of the first image. The multi-function device includes an image processing device configured to convert the first image into a first grey scale image. The first grey scale image includes an eight-bit grey scale image. The image processing device is configured to convert the first grey scale image into a first binary image comprising a plurality of black pixels based on a pre-defined grey threshold, the grey threshold depends on a nature of the first grey scale image. The image processing device is configured to remove text content from the first binary image by replacing the plurality of black pixels with a plurality of white pixels, wherein a flood fill operation is applied for removing text content from the first binary image. The image processing device is configured to apply a dilation method for removing sporadic noise segments to generate a dilated image. The image processing device is configured to extract one or more edges from the dilated image to generate an edge image. The image processing device is configured to determine a degree of rotation "θ" with respect to the base of the first grey scale image by applying a Hough line transformation method. The image processing device is configured to rotate the first image based on the degree of rotation "θ" to generate the re-positioned first binary image. A maximum returned degree of rotation "θ" is considered for rotating the first image and making the shadow region perpendicular to the base. The image processing device is configured to detect at least one shadow region in a central region of the re-positioned first binary image. The image processing device is configured to remove the detected at least one shadow region from the re-positioned first binary image to generate a second image. The image processing device is configured to correct a skewed orientation of each of a cropped left side and a cropped right side of the second image.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
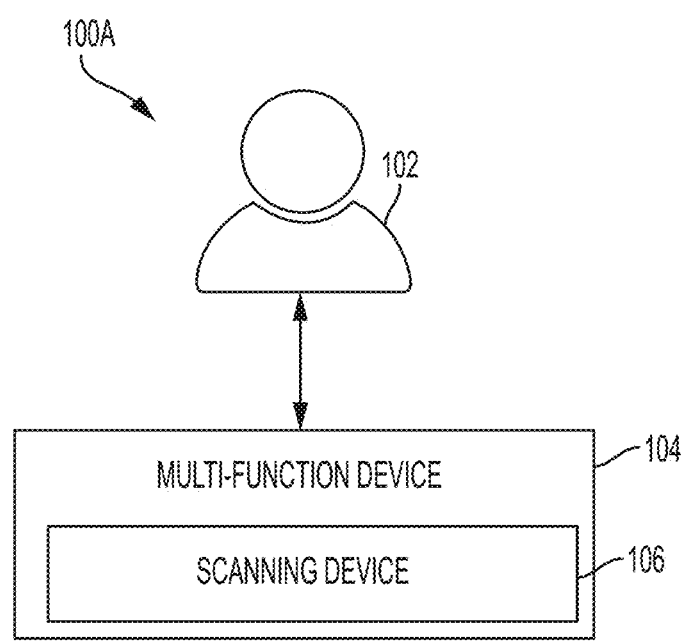
FIG. 1A is a schematic diagram illustrating an exemplary environment where a multi-function device automatically corrects one or more defects present in a scanned image, in accordance with an embodiment of the present disclosure.

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

Definitions

Definitions of one or more terms that will be used in this disclosure are described below without limitations. For a person skilled in the art, it is understood that the definitions are provided just for the sake of clarity, and are intended to include more examples than just provided below.

A "multi-function device" is a single device or a combination of multiple devices configured to perform more than one function such as, but not limited to, scanning, printing, imaging, and so forth. The multi-function device may include software, hardware, firmware, and combination thereof. The multi-function device may include or may interchangeably be used with the phrase "scanning device" or "scanner." In the context of the current disclosure, the multi-function device is configured to automatically correct one or more defects caused while scanning a document.

The term "scanned image" refers a digital copy of a document, which is scanned using a scanning device or a multi-function device. Further, the scanned image may be a pre-stored image or may be generated based on scanning of a document in real-time.

The term "scanning device" is a device configured to scan one or more documents and create a scanned image. The scanning device may or may not be a part of the multi-function device. The scanning device includes software, hardware, firmware, and combination thereof.

The term an "image processing device" is a device or a combination of multiple devices configured to process the one or more scanned images. The image processing device is configured to correct one or more shadow effects or defects that get introduced in a scanned image while scanning.

The term "defects" refer to defects that are created while scanning a document. Few non-limiting examples of such defects are: a shadow region in a central part of the first image, at least one darker region caused at one or more borders of the first image, and distorted orientation with respect to a base of the first image.

The "first image" refers to the scanned image corresponding to a document. The scanned image includes the one or more defects.

The term "second image" refers to the image generated after correcting the defects generated due to scanning.

As used herein, an "authentication device" refers to a device that may or may not be a part of the multi-function device and is configured to authenticate an identity of a user, a computing device, and so forth.

As used herein, a "storage device" refers to a device for storing one or more scanned images, grey scale images, binary images, pre-defined threshold values, and one or more instructions required for processing of the images. The storage device includes software, hardware, firmware, and combination thereof.

Overview

The disclosure generally relates to methods and systems (such as a multi-function device) for automatically correcting a plurality of shadow effects present in a scanned image. The multi-function device receives a first image including a colored twin-page scanned document. The first image includes one or more shadow effects such as, region in a central but not limited to, a shadow part of the first image, at least one darker region caused at one or more borders of the first image, and distorted orientation with respect to a base of the first image. The multi-function device rotates the first image to generate a re-positioned first binary image such that the shadow region becomes perpendicular to the base of the first image. Then, the multi-function device detects at least one shadow region in a central region of the re-positioned first binary image. Further, the multi-function device removes the detected at least one shadow region from the re-positioned first binary image to generate a second image having a left side and a right side. Furthermore, the multi-function device then corrects a skewed orientation of each of the cropped left side and the cropped right side of the second image and then may merge the skew corrected left and right sides.

FIG. 1A is a schematic diagram illustrating an exemplary environment 100A where a multi-function device 104 automatically corrects a number of shadow effects present in a scanned image. The multi-function device 104 performs one or more functions such as, but not limited to, scanning, printing, etc. based on an input from a user 102.

The user 102 accesses one or more functions of the multi-function device 104. In some embodiments, the user 102 may interact with the multi-function device 104 directly via a user interface of the multi-function device 104. The multi-function device 104 further includes a scanning device 106 configured to scan one or more documents to generate one or more scanned images. The one or more documents include, but are not limited to, twin-page colored documents of a thick bound book, twin-page black and white documents of a thick bound book, twin-page colored documents of a thick book, pages of black and white a book, and so forth. The scanned image is a colored image generated by scanning a two-sided document such, as two-sided page of a thick book such as a thick bound book. The multi-function device 104 is configured to receive a scanned image for example a first image including one or more shadow effects. Examples of the shadow effects (or defects) include, but are not limited to, a pyramid shaped darker region primarily caused at a center, where a surface of a book is not completely in contact with a scan bed of the multi-function device 104, darker regions caused at borders and corners of the book where the page touching the scan bed to an outer cover of the book forms a slope and also due to a gap introduced between the scan bed and a scanner cover plate of the multi-function device 104, and an orientation distortion introduced due to an inappropriate distribution of the pages on either sides of the book. The multi-function device 104 is configured to auto correct the shadow effects in the scanned image or document that gets introduced when two-sided pages of a thick book is scanned. The multi-function device 104 is configured to scan a document, auto correct one or more shadow effects (or defects) and then store the auto corrected scanned image.

Figure 1B:
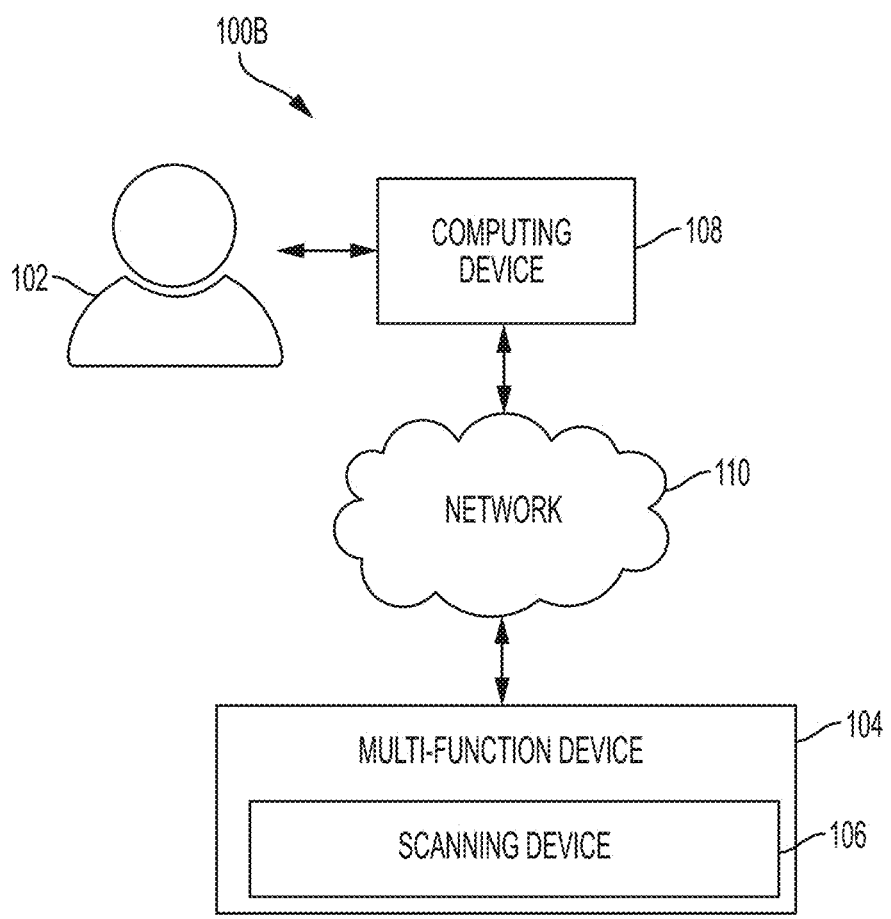
FIG. 1B is a schematic diagram illustrating another exemplary environment where a multi-function device automatically corrects one or more defects present in a scanned image, in accordance with another embodiment of the present disclosure.

FIG. 1B is a schematic diagram illustrating another exemplary environment 100B where the multi-function device 104 automatically corrects a number of shadow effects (or defects) present in a scanned image. The environment 100B primarily includes the user 102 associated with a computing device 108, the multi-function device 104 including the scanning device 106, and a network 110. The scanning device 106 is connected to the computing device 108 via the network 110. The network 110 is a wired network, a wireless network, and combination thereof.

The user 102 may interact with the multi-function device 104 by using the computing device 108. For example, the user 102 may send a scanned image to the multi-function device 104 by using the computing device 108 over the network 110. The multi-function device 104 auto corrects one or more shadow effects present in the scanned document.

The multi-function device 104 is configured to receive a first image including a colored twin-page scanned document. The first image includes one or more of a shadow region in a central part of the first image, at least one darker region caused at one or more borders of the first image, and distorted orientation with respect to a base of the first image. The multi-function device 104 is configured to re-position the shadow region present in the central part of the first image to generate a re-positioned first binary image such that the shadow region becomes perpendicular to the base of the first image. The multi-function device 104 is configured to detect at least one shadow region in a central region of the re-positioned first binary image. The multi-function device 104 is configured to remove the detected at least one shadow region from the re-positioned first binary image to generate a second image including a left side and a right side. In some embodiments, the left side and the right side may have different skew due to an uneven page distribution of both sides. The multi-function device 104 is configured to correct a skewed orientation of each of the left side and the right side of the second image. The multi-function device 104 may be configured to remove skew properly from the left side and the right side to achieve higher accuracy while performing optical character recognition (OCR). The auto correction of the shadow effects by the multi-function device 104 is described in detail with reference to subsequent FIGS. 2A-11.

Figure 2B:
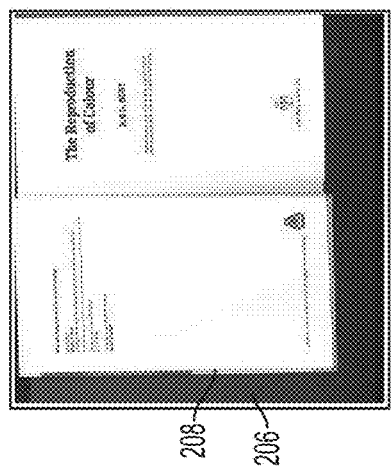
FIGS. 2A-2C depict a number of scanned images with one or more defects, according to an embodiment of the present disclosure.
Figure 2A:
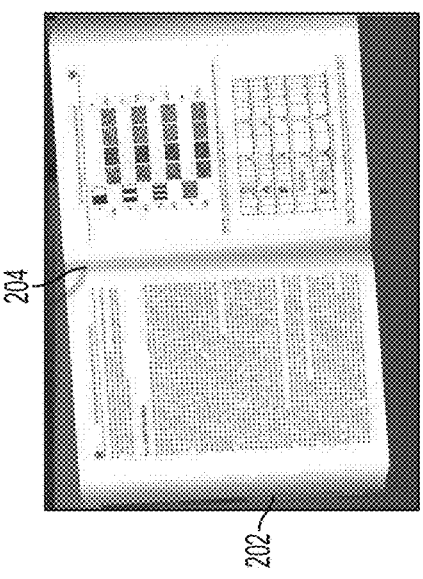
Figure 2C:
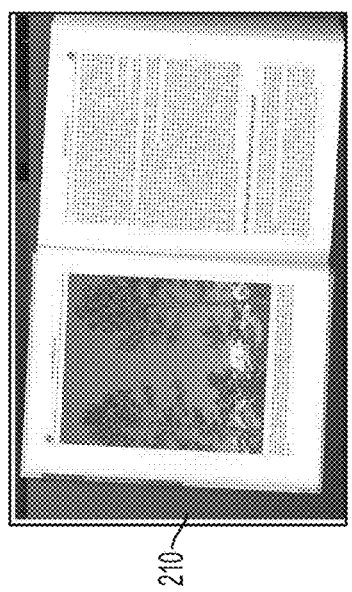

FIGS. 2A-2C depict a number of scanned images including one or more shadow effects that may get introduced while scanning of a twin-page document. As shown in FIG. 2A, a scanned image 202 includes a shadow region 204 in a central part of the scanned image 202. The shadow region 204 is a pyramid shaped darker region caused at the central part, where a surface of the book being printed is not completely in contact with a scan-bed of the multi-function device 104.

FIG. 2B shows a scanned image 206 including a shadow region 208 at borders or edges of a document. The shadow region 208 is a darker region caused at the borders and corners of the book, where the page touching the scan-bed to an outer cover of the book forms a slope and also due to a gap introduced between the scan-bed and a scanner cover plate of the multi-function device 104.

FIG. 2C shows a scanned image 210 having a distorted orientation. The distorted orientation is introduced due to the disproportionate distribution of the pages on either side of the book.

These shadow regions (or effects) 204 and 208 and distorted orientation may raise an amount of toner usage in an Input Output terminal like a printer. Hence in a hefty production printing house like production printing house, removing the highlighted shadow effects from to be printed (already scanned) jobs becomes utmost required. The disclosed multi-function device 104 is configured to remove the shadow effects (or defects) from the scanned images.

Figure 2D:
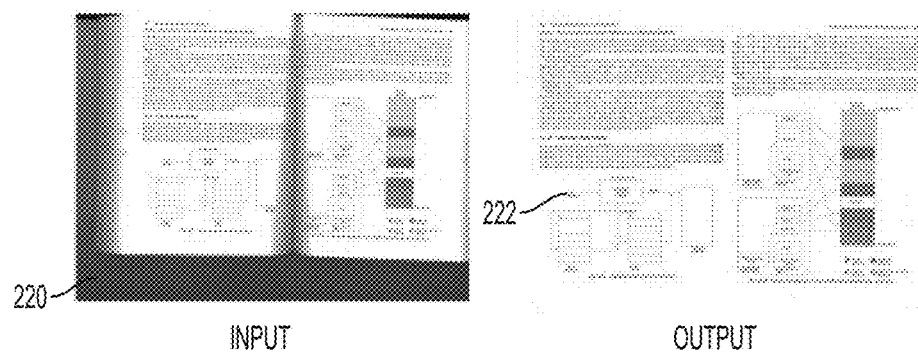
FIGS. 2D-2F indicate input scanned images with defects and corresponding output without defects.
Figure 2E:
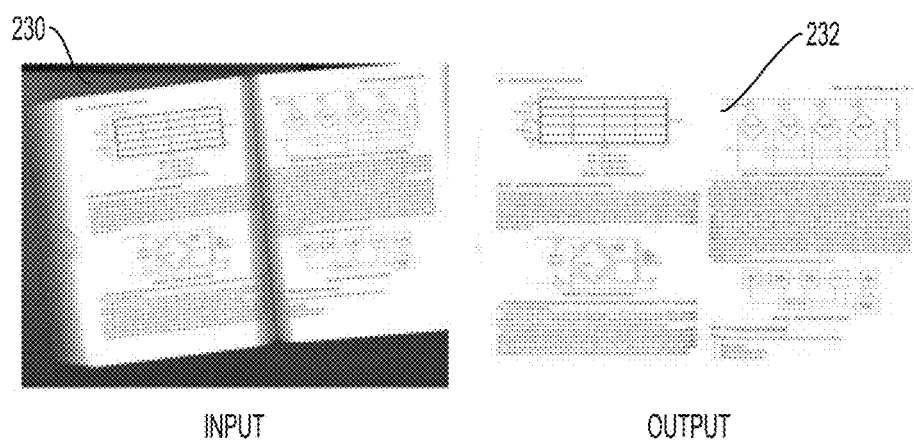
Figure 2F:
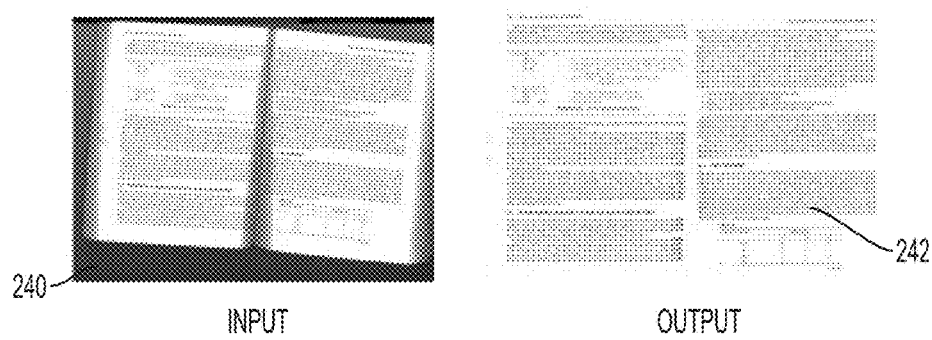

In one exemplary embodiment, exemplary inputs and outputs are shown in FIGS. 2D-2F. For example, FIG. 2D shows an exemplary input 220 where content is present inside the shadow region as a result of scanning. The output generated by the present disclosure is shown as 222, where the content inside the shadow region is placed correctly. Similarly, FIG. 2E shows an input 230 where content is present inside the shadow region and the output 232 indicates the correct document where content is placed properly. On the similar lines, FIG. 2F shows an input 240 with content inside the shadow region and the document with content placed accurately is shown in the output 242.

Figure 3:
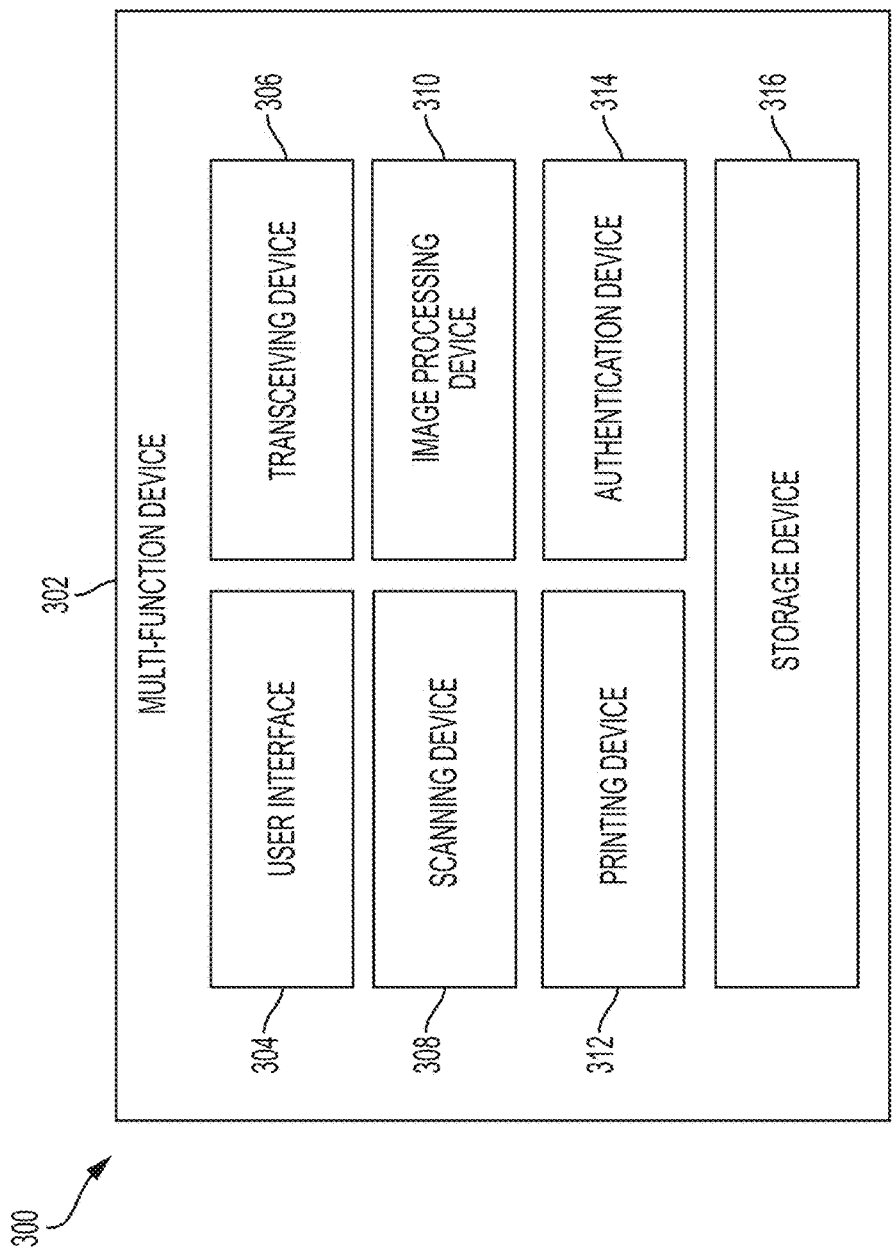
FIG. 3 is a block diagram illustrating various system elements of an exemplary multi-function device, in accordance with various embodiments of the present disclosure.

FIG. 3 is a block diagram 300 illustrating various system elements of an exemplary multi-function device 302, in accordance with various embodiments of the present disclosure. As shown, the multi-function device 302 includes a user interface 304, a transceiving device 306, a scanning device 308, an image processing device 310, a printing device 312, an authentication device 314, and a storage device 316. As discussed with reference to FIG. 1A, the user 102 may interact with the multi-function device 302 via the user interface 304. The user interface 304 is a graphical user interface including one or more graphical options that the user 102 selects for accessing one or more functionalities of the multi-function device 302.

The transceiving device 306 is configured to receive one or more scanned images. In some embodiments, the scanned image is a pre-stored image that is received based on a selection by the user 102. In alternative embodiments, the scanned image is received from a computing device such as, the computing device 108 for processing. In alternative embodiments, the scanning device 308 may generate the scanned image by scanning a colored twin-page document. The scanned images includes a first image including a colored twin-page scanned document. The first image is a scanned image corresponding to a document or a twin-page document of a thick book or a thick bound book. The first image further includes one or more shadow effects (or defects) that are introduced while scanning the document. The one or more shadow effects include, but are not limited to, a shadow region in a central part of the first image, at least one darker region caused at one or more borders of the first image, and distorted orientation with respect to a base of a scanned image (i.e., the first image). The transceiving device 306 is a software, hardware, firmware, or combination of these.

The scanning device 308 is configured to scan one or more documents to generate one or more scanned images. The scanned images are stored in the storage device 316. The storage device 316 may further store identifier of a number of users, a number of computing devices, a number of networks, and so forth. The scanning device 308 is a software, hardware, firmware, or combination of these.

The image processing device 310 is configured to reposition the shadow region present in the central part of the first image to generate a re-positioned first binary image such that the shadow region becomes perpendicular to the base of the first image. The image processing device 310 is configured to detect at least one shadow region in a central region of the re-positioned first binary image. The image processing device 310 is configured to the remove the detected at least one shadow region from the re-positioned first binary image to generate a second image including a left side and a right side. In some embodiments, the left side and the right side have different skew due to an uneven page distribution of both sides. The image processing device 310 is configured to correct a skewed orientation of each of a cropped left side and a cropped right side of the second image. The image processing device 310 is configured to remove skew properly from the left side and the right side to achieve higher accuracy while performing optical character recognition (OCR).

For re-positioning of the shadow region, the image processing device 310 is configured to convert the first image into a first grey scale image. The first grey scale image is an eight-bit grey scale image. The image processing device 310 is configured to convert the first grey scale image into a first binary image including a number of black pixels based on a pre-defined grey threshold. The image processing device 310 is configured to remove text content from the first binary image by replacing the black pixels with a number of white pixels. A flood fill operation is applied to remove the text content. The image processing device 310 is configured to apply a suitable dilation method for removing sporadic noise segments from the image generated after applying the flood fill operation. A dilated image is generated by applying the dilation method. The image processing device 310 is configured to extract one or more edges from the dilated image. In some embodiments, only horizontal edges are considered and extracted. The image processing device 310 is configured to determine a degree of rotation "θ" with respect to the base of the first grey scale image. The degree of rotation "θ" is determined by applying a Hough line transformation method. Furthermore, the image processing device 310 is configured to rotate the first image based on the degree of rotation "θ" to generate the re-positioned first binary image, wherein a maximum returned degree of rotation "θ" is considered for rotating the first image and making the shadow region perpendicular to the base. In some embodiments, the image processing device 310 may re-position the shadow region based on the degree of rotation "θ" to generate the re-positioned first binary image.

Further, the image processing device 310 is configured to detect at least one shadow region in a central region of the re-positioned first binary image. The image processing device 310 is configured to remove the detected at least one shadow region from the re-positioned first binary image to generate a second image including a left side and a right side. In some embodiments, the left side and the right side have different skew due to an uneven page distribution of both sides. Furthermore, the image processing device 310 is configured to correct a skewed orientation of the left side and the right side of the second image.

For correcting the skew of each of the left side and the right side of the second image, the image processing device 310 may divide the second image into a cropped left side and into a cropped right side. For each of the cropped left side and the cropped right side, the image processing device 310 is configured to convert a cropped side of the cropped left side and into a cropped right side of the second image into a second grey scale image including one or more black pixels. Further, the image processing device 310 is configured to remove text content from the second grey scale image by replacing the one or more black pixels with one or more white pixels. A flood fill operation is applied for removing the text content. The image processing device 310 is configured to generate an eroded image by expanding an area of the second grey scale image by applying any known suitable image erosion method. The erosion methods are well known in the art. The erosion methods may be used to extent the page area by a few pixels if there is any white pixel present outside of a page border. The image processing device 310 is configured to create a complementary image corresponding to the eroded image. The image processing device 310 is configured to generate a painted eroded image by replacing a pixel at a position in the eroded image with a pixel value present in a same position in the second grey scale image when a pixel other than a white pixel is encountered in the complementary image. The image processing device 310 is configured to create a second binary image of the painted eroded image.

The image processing device 310 is configured to extract one or more edges from the second binary image. In some embodiments, the one or more edges are extracted from the second binary image by applying a canny operator. The image processing device 310 is configured to rotate the second binary image to remove a skew from the second binary image. In some embodiments, the skew is removed from the second binary image by applying a Hough line transformation method. Further, a maximum returned degree is considered for rotating the second binary image. The image processing device 310 is a software, hardware, firmware, or combination of these.

The printing device 312 is configured to print one or more files. The files are software copy pre-stored in the storage device 316. The files are one or more pages or files downloaded from a network such as the Internet. The printing device 312 is a software, hardware, firmware, or combination of these.

The authentication device 314 is configured to authenticate an identity of a user, a computing device, a network, and so forth. The authentication device 314 is a software, hardware, firmware, or combination of these.

The storage device 316 is configured to store a number of grey scale images, binary images, pre-defined threshold values, and one or more instructions required for processing of the images. The storage device 316 may further store auto corrected scanned images. The storage device 316 includes software, hardware, firmware, and combination thereof.

Figure 4:
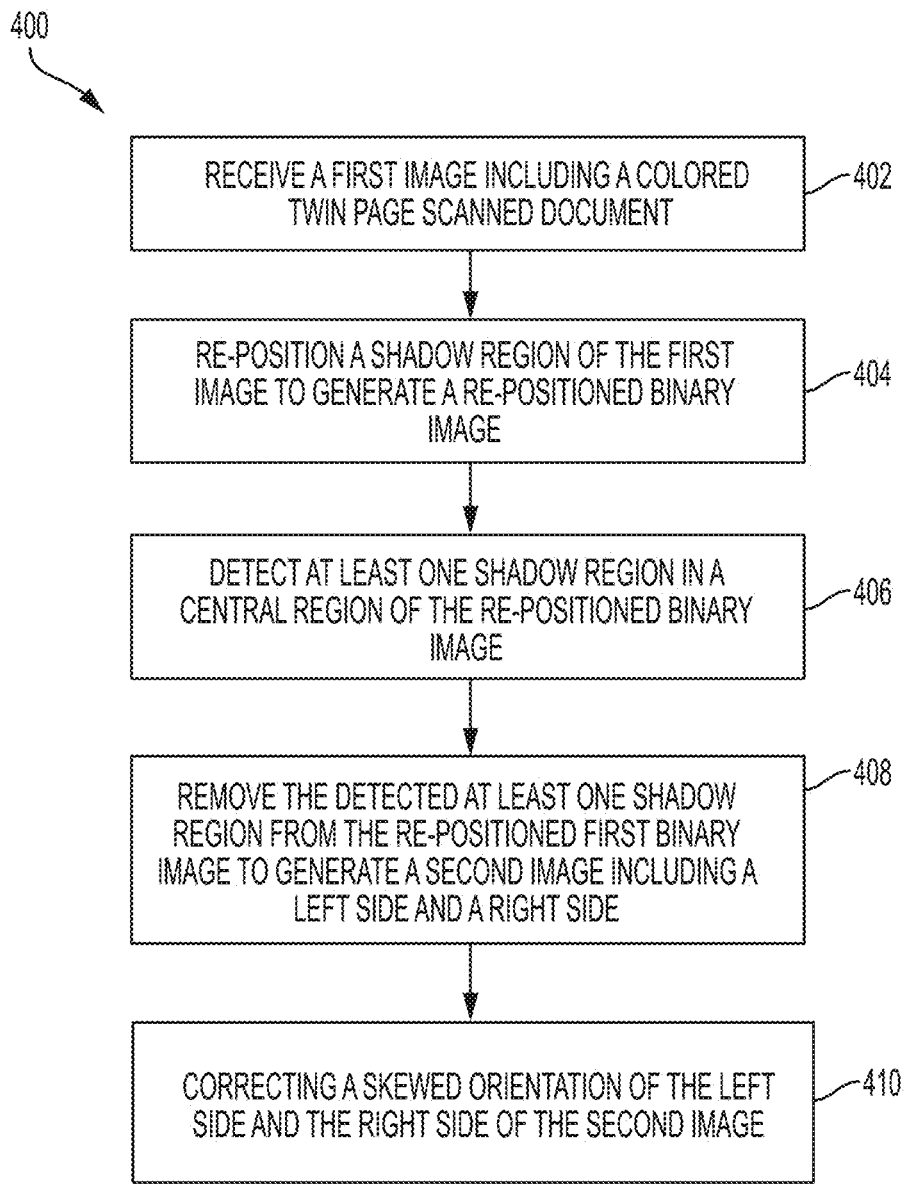
FIG. 4 represents a flowchart for automatically correcting one or more defects present in a scanned image, in accordance with an embodiment of the present disclosure.

FIG. 4 is a flowchart illustrating an exemplary method 400 for automatically correcting a number of shadow effects (or defects) present in a scanned image, in accordance with an embodiment of the present disclosure. As discussed with reference to FIG. 1A, the user 102 may interact with the multi-function device 104. Further, as discussed with reference to FIG. 1B, the user 102 may access the multi-function device 104 using the computing device 108. The computing device 108 may connect to the multi-function device 104 over the network 110. Further, as shown in FIG. 3, the multi-function device 302 (or 104) includes the user interface 304, the transceiving device 306, the scanning device 308, the image processing device 310, the printing device 312, the authentication device 314, and the storage device 316. A twin-page scanned document (e.g., in an RGB format) is an input for scanning and a corresponding scanned document is generated by the scanning device 308 of the multi-function device 302.

At 402, a first image (is represented as "I") including a colored twin-page scanned image is received. In some embodiments, the transceiving device 306 of the multi-function device 302 receives the first image. The first image is a scanned image of a twin-page of a thick bound book. Further, the first image includes one or more shadow effects (or defects) including at least one of a shadow region in a central part of the first image, at least one darker region caused at one or more borders of the first image, and distorted orientation with respect to a base of the first image.

Then at 404, the shadow region is re-positioned in the central part of the first image to generate a re-positioned first binary image. The shadow region is re-positioned such that the shadow region becomes perpendicular to the base of the first image. In some embodiments, the image processing device 310 of the multi-function device 302 re-positions the shadow region.

At 406, at least one shadow region in a central region is detected in a central region of the re-positioned first binary image. In some embodiments, the image processing device 310 detects the at least one shadow region in the central region of the re-positioned first binary image.

Then at 408, the detected at least one shadow region is removed from the re-positioned first binary image to generate a second image including a left side and a right side (second side). In some embodiments, the image processing device 310 removes the detected at least one shadow region.

Thereafter at 410, a skewed orientation of each of the left side and the right side of the second image is corrected. In some embodiments, the left side and the right side have different skew due to an uneven page distribution of both sides. In some embodiments, the image processing device 310 corrects the skewed orientation of each of the left side and the right side of the second image.

Figure 5A:
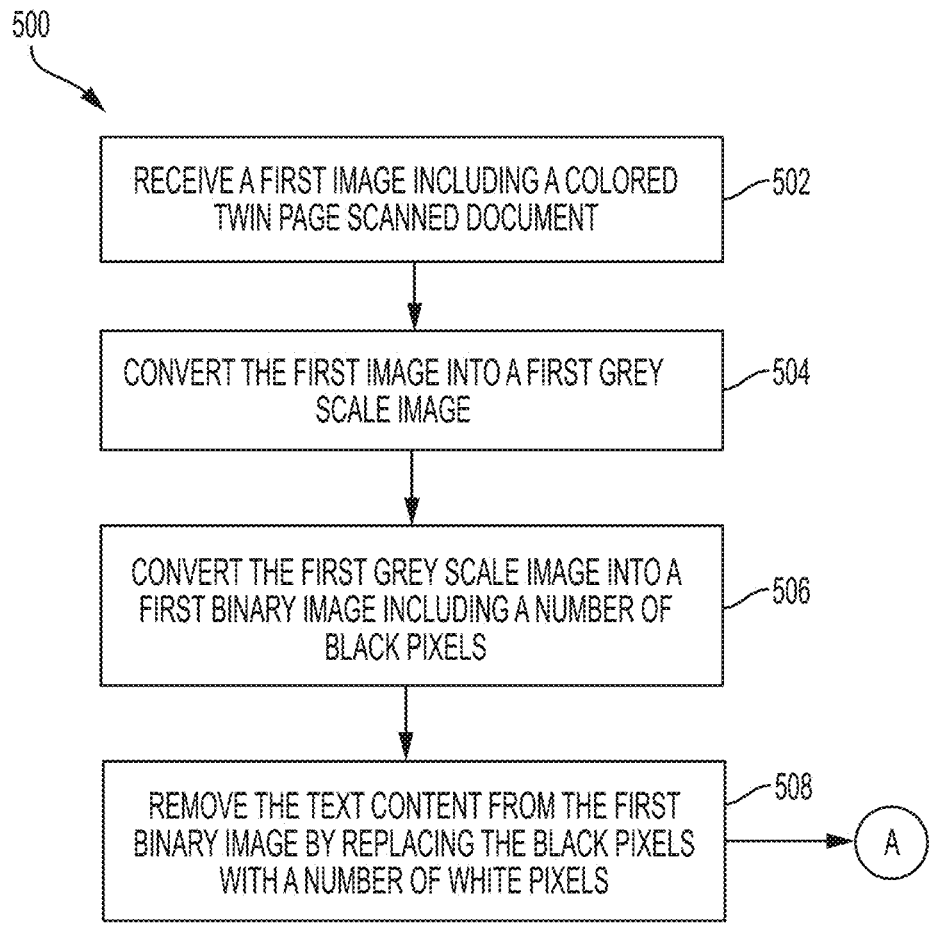
FIGS. 5A-5B represent a flowchart for re-positioning a central part of a shadow region of a first image, in accordance with an embodiment of the present disclosure.
Figure 5B:
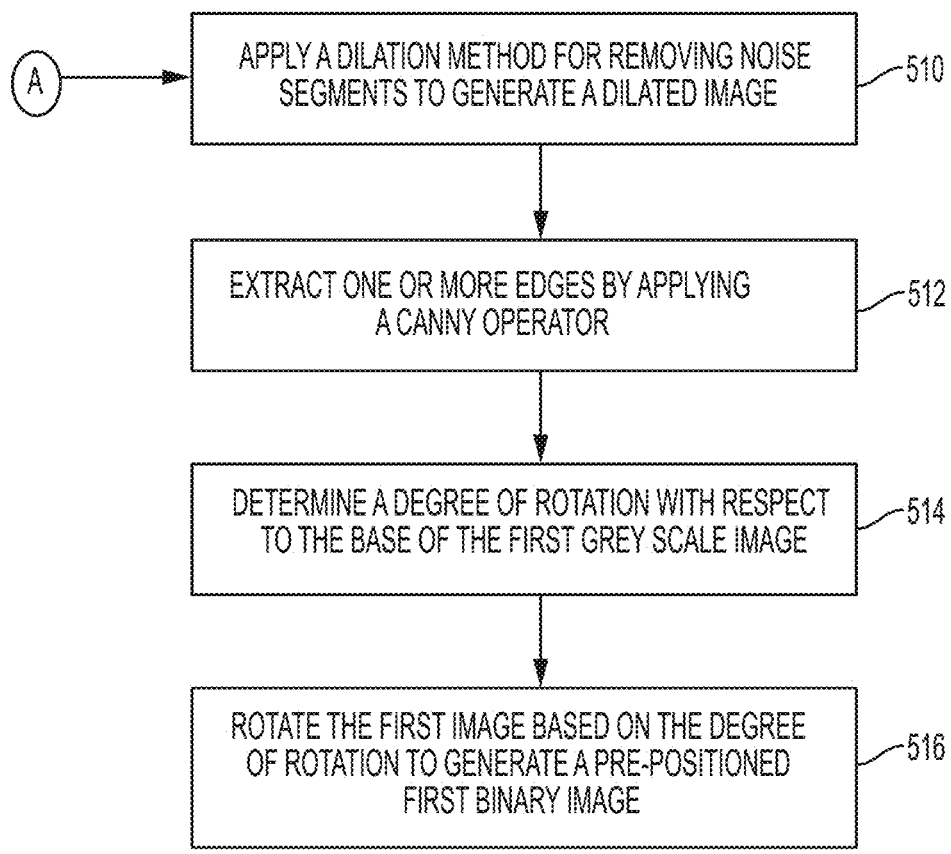

FIGS. 5A-5B represent an exemplary method 500 for re-positioning a central part of a shadow region of a first image, in accordance with an embodiment of the present disclosure. A twin-page scanned document (e.g., in an RGB format) is an input for scanning and a corresponding scanned document is generated by the scanning device 308 of the multi-function device 302.

At 502, a first image (is represented as "I") including a colored twin-page scanned image is received. The first image "I" is of a dimension X*Y, where "X" being a width and "Y" being a length of the first image. In some embodiments, the transceiving device 306 of the multi-function device 302 receives the first image. The first image is a scanned image of a twin-page of a thick bound book. Further, the first image includes one or more shadow effects including at least one of a shadow region in a central part of the first image, at least one darker region caused at one or more borders of the first image, and distorted orientation with respect to a base of the first image.

At 504, the first image is converted into a first grey scale. In some embodiments, the image processing device 310 converts the first image (or "I") into the first grey scale image. The first image (or "I") of dimension X*Y is converted to its equivalent eight-bit first grey scale image (is represented as "G"). The first grey scale image (or "G") is an eight-bit grey scale image. Then at 506, the first grey scale image (or "G") is converted into a first binary image including a number of black pixels. In some embodiments, the image processing device 310 converts the first grey scale image into the first binary image based on a pre-defined grey threshold.

Then at 508, text content from the first binary image is removed by replacing the black pixels with a number of white pixels. In some embodiments, the image processing device 310 removes the text content from the first binary image by applying a flood fill operation. At this only the shadow region present in the central part need to be made perpendicular, therefore, the text content (or other image content, etc.) of the image is removed. The flood fill operation is applied to make all the content painted as background. Even though all the contents are converted as the background but still some sporadic noise segments are observed in the image. In some scenarios, the hard copies to be scanned may hardly occupy the entire glass or a scan bed of the MFD (or scanner). This may result in background noise segments or sporadic noise segments in the scanned image. Therefore, at 510, a suitable known dilation method is applied to remove the noise segments and generate a dilated image. The dilation methods are well known in the art. The suitable dilation methods may be performed using a structural element like ball of size [10, 10].

Then at 512, a canny operator is applied to extract one or more edges from the dilated image. As the shadow region is expected to appear with vertical orientation, hence one or more vertical edges may not be considered and only one or more horizontal edges are considered while extracting the edges to generate an edge image. In some embodiments, the canny operator is an edge detection operator that uses a multi-stage method or algorithm for detecting edges in scanned images. First of all the painted eroded image is smoothed by Gaussian convolution. Then a simple 2-D first derivative operator, for example, but not limited to Roberts Cross, is applied to the smoothed image to highlight regions of the image with high first spatial derivatives. Edges may give rise to ridges in the gradient magnitude image. The top of these ridges may then be tracked and all pixels that are not actually on the ridge top are set to zero so as to give a thin line in the output, a process known as non-maximal suppression.

The tracking process exhibits hysteresis controlled by two thresholds: "T1" and "T2," where T1>T2. Further, tracking may only begin at a point on a ridge higher than "T1." The tracking may then continue in both directions out from that point until the height of the ridge falls below "T2." This hysteresis may help to ensure that noisy edges are not broken up into multiple edge fragments.

At 514, a degree of rotation "θ" is determined with respect to the base of the first grey scale image. In some embodiments, the image processing device 310 determines the degree of rotation "θ" by applying a Hough line transformation method. Then at 516, the first image based is rotated to generate the re-positioned first binary image based on the degree of rotation "θ," wherein a maximum returned degree of rotation "θ" is considered for rotating the first image and making the shadow region perpendicular to the base.

Further, a maximum returned degree of rotation "θ" is considered for rotating the original image i.e. the first image or the shadow region in the first image. In some embodiments, the image processing device 310 re-positions the shadow region present in the central part such that the shadow region becomes perpendicular with respect to a base of the first image.

This way the expectation of the method 500 of making the shadow region perpendicular to the base of the first image is achieved. The shadow region is made perpendicular to the base of the first image to enable easy extraction of the shadow region.

FIGS. 6A-6G show a number of scanned images illustrating one or more stages of re-positioning of a shadow region present in a central part of a first image, in accordance with an embodiment of the present disclosure. FIGS. 6A-6G show the scanned images in accordance with various steps described in the method 500 of FIGS. 5A-5B. As discussed with reference to FIGS. 1A-1B, the multi-function device 104 is configured to receive the first image. In some embodiments, the first image is received from the computing device 108. In alternative embodiments, the first image is selected from pre-stored images in the storage device 316 of the multi-function device 302 as discussed with reference to FIG. 3.

Figure 6A:
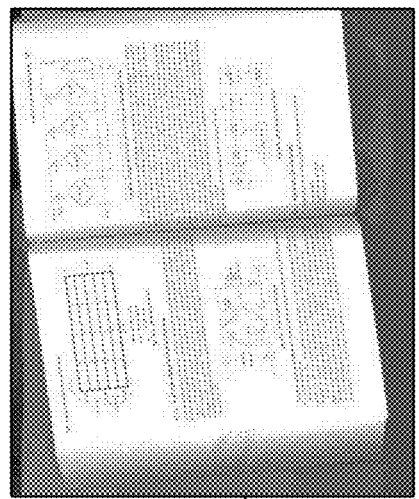
FIGS. 6A-6G show a number of scanned images illustrating one or more stages of re-positioning of a shadow region present in a central part of a first image, in accordance with an embodiment of the present disclosure.

Turning now to FIG. 6A, a first image 602 (or an input image "I") including a colored twin-page scanned image is shown. The first image 602 is considered to have a dimension of X*Y, where "X" being a width and "Y" being a length of the first image 602.

Figure 6B:
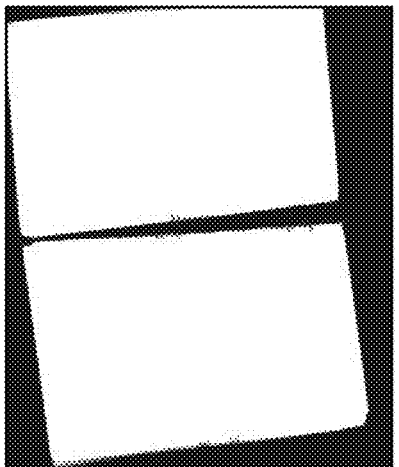
Figure 6C:
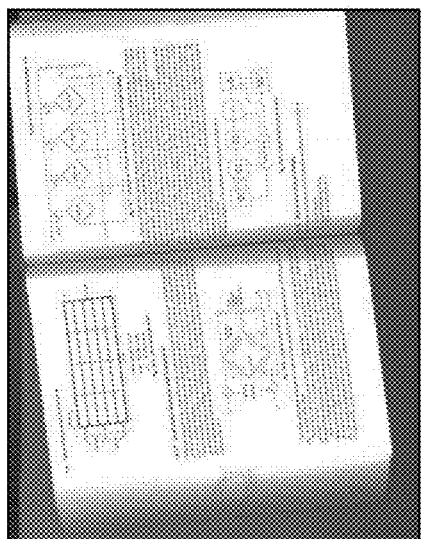

The first image 602 (or "I") is converted into an eight bit grey scale image 604. FIG. 6B shows the grey scale image 604 (is represented as "G"). The eight-bit grey scale image 604 may then be converted into a first binary image 606 using a grey threshold as shown in FIG. 6C. The grey threshold may help to create the first binary image 606 from the grey scale image 604. In an exemplary scenario, when an Otsu's method is used, then from the grey scale image 604, it may determine a threshold for the entire image. The grey threshold may depend on a nature of the grey scale image 604. The first binary image 606 is referred as a threshold image and is represented as "GT."

Figure 6D:
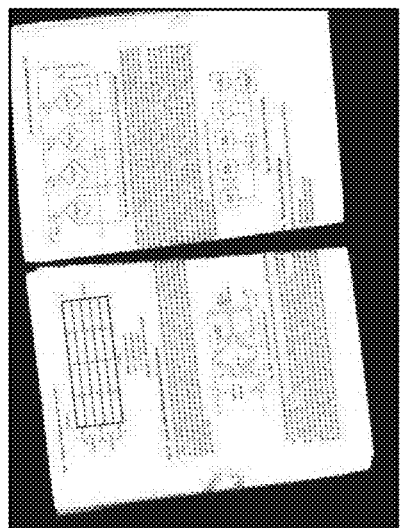

Then, a flood fill operation is applied to make content such as text content of the first binary image 606 (or "GT") painted as background as shown in FIG. 6D. All content and the background is made white by replacing black pixels of the first binary image with a number of white pixels as shown by the scanned image 608 in FIG. 6D. The scanned image 608 is an image generated after applying the flood fill operation on the "GT."

Figure 6F:
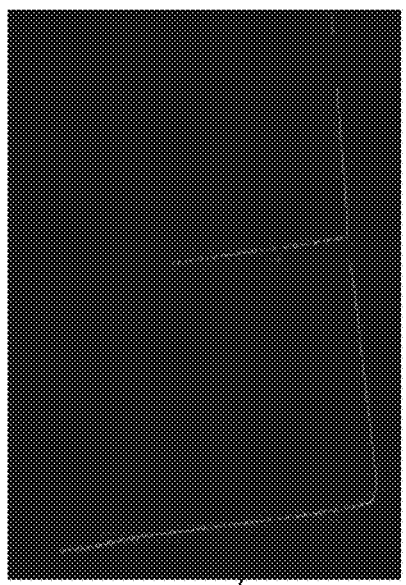
Figure 6G:
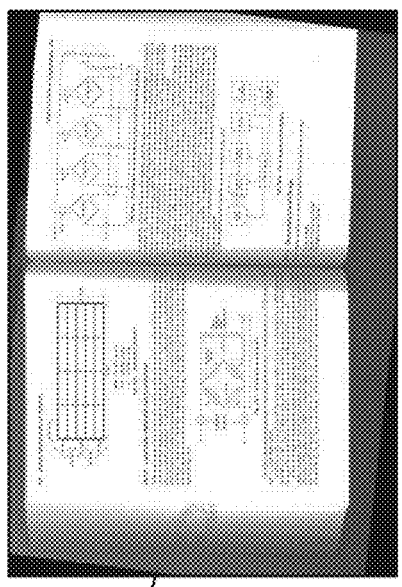
Figure 6E:
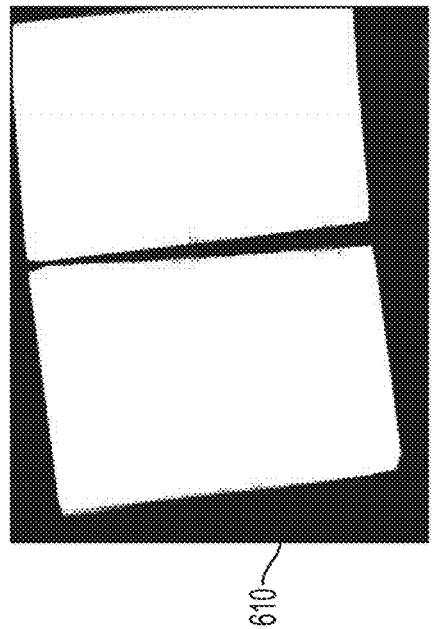

Even though all the contents (like text content) are converted as background but still some sporadic noise segments are observed. In some scenarios, the hard copies to be scanned may not occupy the entire glass or a scan bed of the MFD (or scanner) properly. This may result in background noise segments or sporadic noise segments in the scanned image. To remove the infrequent noise parts, one of morphological techniques such as, but not limited to, a dilation method is furnished on the scanned image 608 to generate a dilated image 610. FIG. 6E shows the dilated image 610.

Then, a canny operator is applied to extract only one or more horizontal edges from the dilated image 610. As the shadow region is expected to appear with a vertical orientation that's why only horizontal edges are considered while extraction to generate an extracted horizontal edge image 612 as shown in FIG. 6F.

Then a degree of rotation "θ" is determined. In some embodiments, a Hough line transformation is applied to determine the degree of rotation "θ" with respect to a base of the first image 602 and a maximum returned degree of rotation "θ" is considered to rotate the first image 602. FIG. 6G shows a rotated image 614 after applying Hough line transformation method. The Hough line transformation is applied on the extracted horizontal edge image 612 to determine the degree of skew/rotation "θ."

Figure 6H:
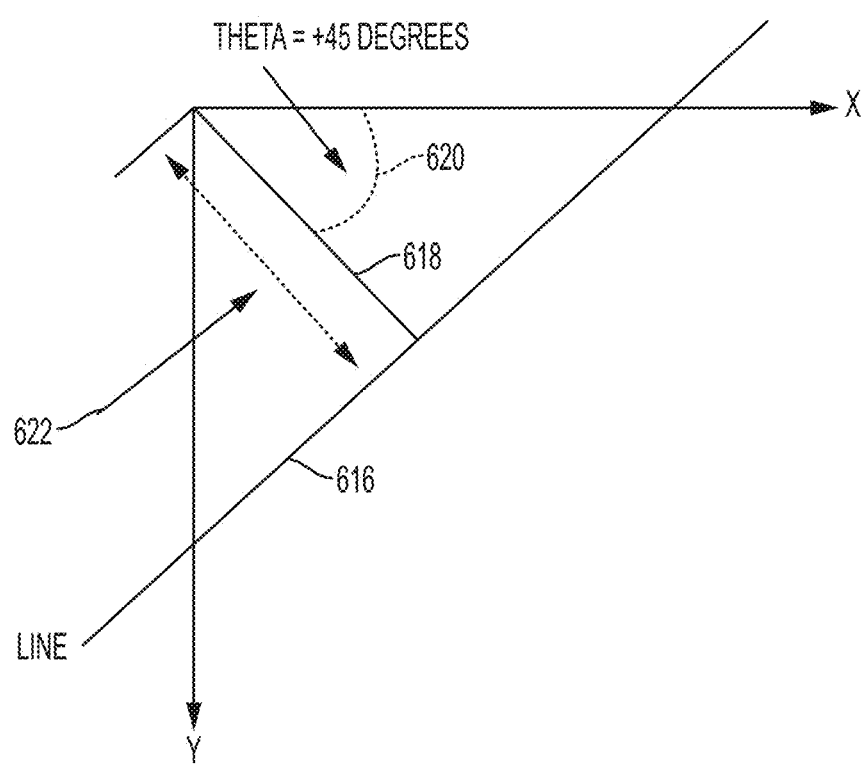
FIG. 6H illustrates a Hough line transformation method representation for determining a rotation angle "θ," in accordance with an embodiment of the present disclosure.

Turning now to FIG. 6H, a Hough line transformation method representation for determining a rotation angle or the degree of rotation "θ" (theta) with respect to a base of the first image 602 is shown. In some embodiments, the Hough line transformation may detect lines from a canny edge image (i.e., the extracted horizontal edge image 612) and return a distance 622 (also represented as "r") from an origin to a line 616 along a vector 618 perpendicular to the line 616, and an angle 620 in degrees between an x-axis and this vector 618. The "r" is the distance 622 from the origin to the line 616 along the vector 618, which is perpendicular to the line 616. Further, "θ" is an angle of the perpendicular projection from the origin to the line measured in degrees clockwise from a positive x-axis. The range of "θ" is −90°≤θ<90°. The angle of the line 616 is θ+90°, when measures clockwise with respect to the positive x-axis. Further, as per the Hough line transformation method, a maximum degree is selected to perform image rotation, i.e., a rotation of the first image, which may make the shadow region exactly perpendicular to the base of the twin-page scanned document as shown in FIG. 6G.

Figure 7C:
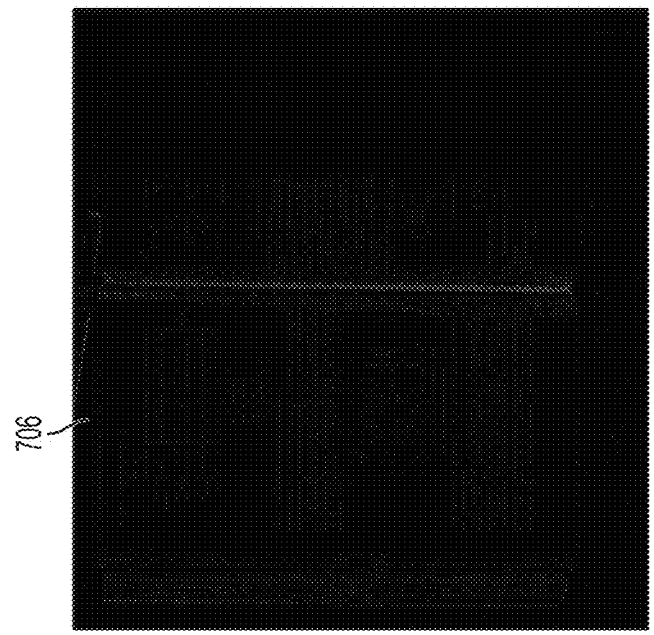
FIG. 7C shows a $B_{shadow}$, in accordance with an embodiment of the present disclosure.
Figure 7A:
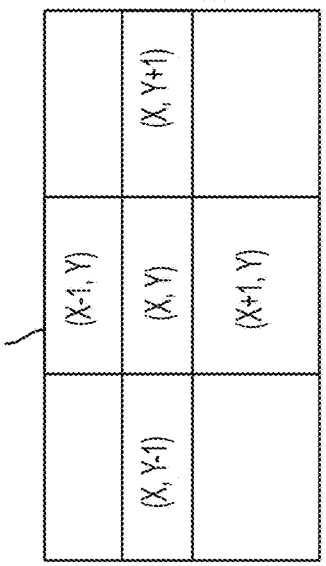
FIGS. 7A-7B show various position matrix used for shadow region extraction and detection, in accordance with various embodiments of the present disclosure.
Figure 7B:
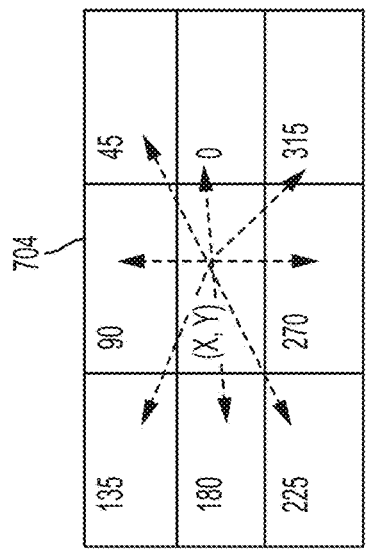

FIGS. 7A-7B show various position matrix (or windows) used for shadow region extraction and detection, in accordance with various embodiments of the present disclosure. When twin-pages of a thick bound book are scanned, then due to gap between a scan-bed of the multi-function device 302 (or 104) and a binding center of the book may not come in contact with the scanner bed and in turn some amount of shadow is created at a central part of the scanned image as shown in FIG. 2A. Similarly, some shadow regions are created at borders of the scanned images, where the page touching the scan-bed to an outer cover of the book forms a slope and also due to a gap introduced between the scan-bed and a scanner cover plate of the multi-function device 104. The multi-function device 302 is configured to detect the shadow regions and correct the shadow regions from the scanned image such as, the first image. In the scanned image there is ample amount of high intensity region, which may end up with low intensity region (this may identify an appearance of shadow) and again it may gain the intensity to a higher range (this may detect a disappearance of shadow).

FIG. 7A shows a pixel position in a grey scale image or "G" of a scanned image, such as the first image, as discussed with reference to FIGS. 6A-6H. FIG. 7A shows a sample window 702 of size 3×3 which is placed on G from a starting pixel, i.e., G (0, 0). The same pixel position is modified in that of a matrix of zero degree "B0." The multi-function device may extract the information of shadow region present in the first image or the grey scale image "G" based on the matrix of zero degree "B0" as shown in FIG. 7B. As discussed with reference to FIG. 6A-6H, after rotating the shadow region if the gray scale image "G" is of a dimension X*Y such that G(x,y)ϵ[0,255], an equivalent buffer is created of same dimension "B0," which is referred as the matrix of zero degree.

And the window 702 is traversed in a non-overlapping way through the "G." For processing of the window 702, the multi-function device 302 may execute a first logic. As discussed with reference to FIG. 3, the image processing device 310 may process the window 702 by executing the following first logic including one or more block of statements.

For each x=2:X Count=0;
For each y=2:Y If G(x,y)>G (x,y+1) Count++;
End If End For B0(x,y)=Count;
End For The above first logic may capture the variation of intensities of high-to-low region in horizontal direction that means zero degree. To localize the exact location of a shadow region, specifically to track the variation of high intensity to low intensity the image processing device 310 may perform the above first logic for different angles. For example, as shown in a direction of degree matrix 704, the first logic is performed for 45 degree, 135 degree, 180 degree, 225 degree and 315 degree, respectively, as shown in the direction of degree matrix 704 in FIG. 7B.

FIG. 7C shows a $B_{shadow}$ 706, in accordance with an embodiment of the present disclosure. The image processing device 310 may track the shadow region in the "G" by analyzing intensity variation in mostly horizontal direction and may discard calculating the matrix of 90 degree (B90) and the matrix of 270 degree (B270), respectively. Moreover it is considered that there may not be much intensity variation in both side vertical direction. After obtaining all the degree matrices, the image processing device 310 may sum them up (as shown in Equation 1) to obtain one resultant matrix that may have cumulative variation of intensities of all directions except the discarded directions.

$$B_{Low-to-High} = B0 + B45 + B135 + B180 + B225 + B315 \quad \text{Equation 1:}$$

The image processing device 310 may obtain $B_{Low-to-High}$ by following the same steps as explained above in the first logic, and by modifying the above piece of snippet as shown in below second logic.

For each x=2:X Count=0;
  For each y=2:Y
    If G(x,y)<G (x,y+1)
      Count++;
    End If
  End For B0(x,y)=Count;
End For The image processing device 310 may obtain a final summed matrix, i.e., $B_{shadow}$, by using the below Equation 2:

$$B_{shadow} = B_{High-to-Low} + B_{Low-to-High} \quad \text{Equation 2:}$$

The $B_{shadow}$ 706 may contain information of detected and extracted shadow region. A plot on the $B_{shadow}$ 706 and its vertical white projection profile is shown in FIG. 7C.

If a projection profile of $B_{shadow}$ 706 is drawn, then the shadow region is clearly visible in the scanned image. The image processing device 310 may now analyze a starting and an ending location of the shadow region. To achieve this, first a highest peak point ($H_{Mean}$) of the vertical projection is identified that is followed by identifying a region of interest from the $B_{shadow}$ 706 by using an Equation 3.

$$B_{Shadow-Extracted} = B_{Shadow}(*, (H_{Mean} - \text{ceil}(Y/k)) : \\ (H_{Mean} + \text{ceil}(Y/k))) \quad \text{Equation 3:}$$

In an exemplary execution of the Equation 3, the value of constant k has been chosen as 6.

In $B_{Shadow-Extracted}$ matrix, the image processing device 310 may traverse all columns from the left side to find the minimum count and the position is marked as $H_{Min-Left}$. Likewise, the image processing device 310 may traverse all columns from the right side to find the minimum count and the position is marked as $H_{Min-Right}$. Now the image processing device 310 may check the column position (Y-value) of $H_{Min-Left}$ and $H_{Min-Right}$. If the column positions are found to be say $Y_{Left}$ and $Y_{Right}$ where $0 < Y_{left} < Y_{Right} < Y$ for $H_{Min-Left}$ and $H_{Min-Right}$, respectively. Basically $Y_{left}$ and $Y_{Right}$ is boundaries of shadow extracted image and $H_{Min-Left}$ and $H_{Min-Right}$ is a minima of the projection profile. From the input scanned image (that is in an RGB format), the shadow region is extracted as $I_{Cropped}(*, Y_{left}: Y_{Right})$. The same way same region has been cropped from gray scale image, namely $G_{Cropped}$. The output of this step is furnished in shown in FIG. 7D.

Figure 7D:
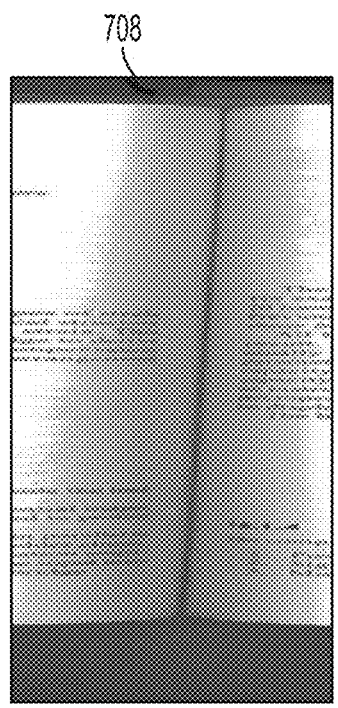
FIG. 7D shows an extracted shadow region, in accordance with an embodiment of the present disclosure.

FIG. 7D shows an extracted shadow region 708, in accordance with an embodiment of the present disclosure. From the shadow region 708, it can be observed that in many places shadow has appeared with smear presence of text or image. So to remove only shadow and shadow within text and image, the image processing device 310 may perform one or more operations as discussed with reference to subsequent FIGS. 7E-7F.

Figure 7F:
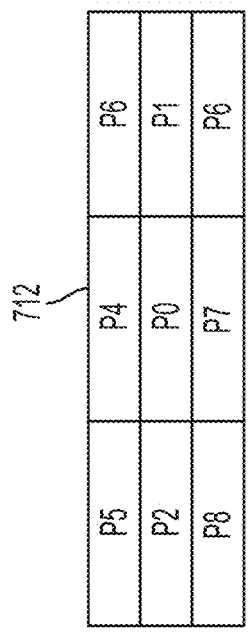
FIGS. 7E-7F show at least two matrix used for shadow removal from the first image, in accordance with an embodiment of the present disclosure.
Figure 7E:
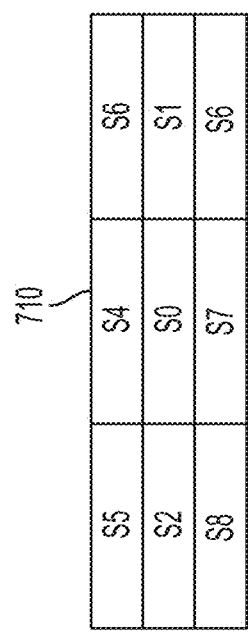

FIGS. 7E-7F show at least two matrix (or windows) used for shadow removal from the first image (or the extracted shadow region 708), in accordance with an embodiment of the present disclosure. In the shadow region 708, it has been observed that in many places shadow has appeared with smear presence of text or image. So in order to remove only shadow and shadow within text and image below operations have been performed. FIG. 7E shows a window 710 and the FIG. 7F show a window 712. The two windows, i.e. the window 710 and the window 712, is of size 3×3 and is taken and placed on $G_{Cropped}$ and $B_{shadow-Extracted}$, respectively. The window 710 is a 3×3 window placed on $B_{Shadow-Extracted}$ and the window 712 is a 3×3 window placed on $G_{Cropped}$.

The image processing device 310 is configured to remove the detected shadow regions by examining all the pixels belonging to both the windows 710 and 712 while considering the below conditions.

IF Min (P0, P1, . . . P7)>Th1 and Δ I<10 then Paint the location of P0 in I as white;
  Else IF Min (S0, S1, . . . S7)>Th2 and Δ I<10 then Paint the location of P0 in I as white;
  Else IF G(P0)>Th3 and Δ I<10 then Paint the location of P0 in I as white;
End IF The image processing device 310 may execute and check the above conditions iteratively once both the sliding windows 710-712 can be taken to its next location in an overlapping way. "Δ I" is a 3×3 window placed on "I" (i.e., the input image) at the same position as other windows like cropped image or shadow extracted image.

The image processing device 310 may first calculate a minimum value from each column for each plane (R,G,B) and generate a vector, again the image processing device 310 may find the minimum value from the vector. This minimum value may then be compared with different thresholds (e.g., the pre-defined grey threshold). Min(A0, . . . An) returns the minimum value of all the members considered in the function, where 0<=n<=7. "Th1," "Th2," and "Th3" are pre-defined thresholds and is constants. Further, in an exemplary scenario, the "Th1," "Th2," and "Th3" is set to 180, 24 and 105, respectively. Here used three different thresholds are used to extract the information of shadow from three different scenarios. The "Th1" may identify the appearance of the shadow area, the "Th2" may identify the appearance of the shadow within text or image, and the "Th3" may identify the appearance of only text. The output of this technique is shown in FIG. 7G.

Figure 7G:
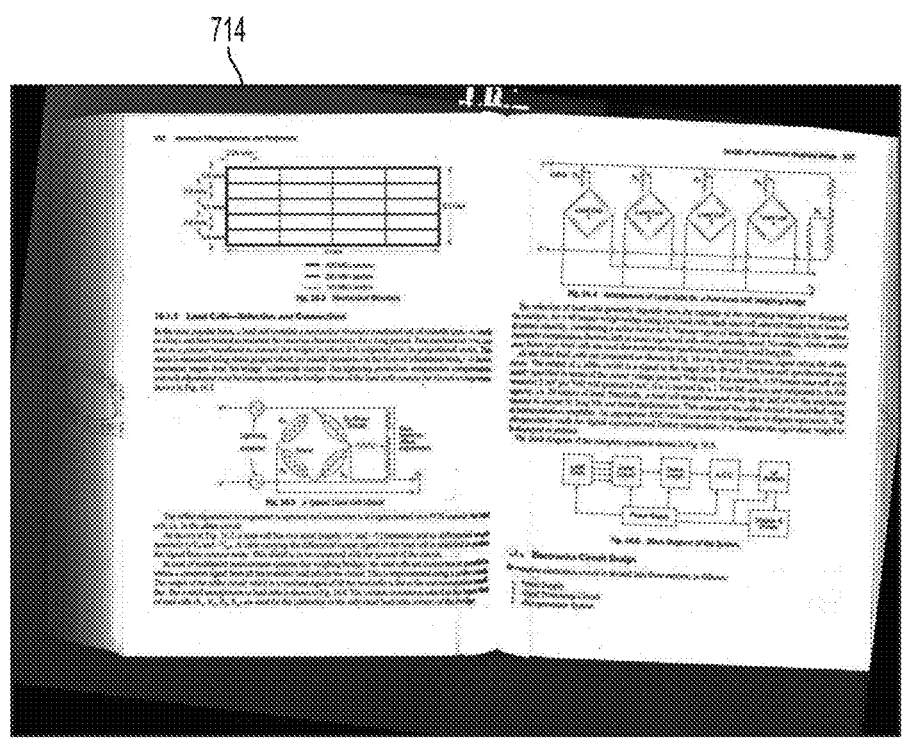
FIG. 7G shows a shadow removed image, in accordance with an embodiment of the present disclosure.

FIG. 7G shows a shadow removed image 714, in accordance with an embodiment of the present disclosure. Now, the image processing device 310 may correct a skewed orientation of the shadow removed image 714 (or the second image) as described in detail with reference to FIGS. 8A-10I.

Figure 8B:
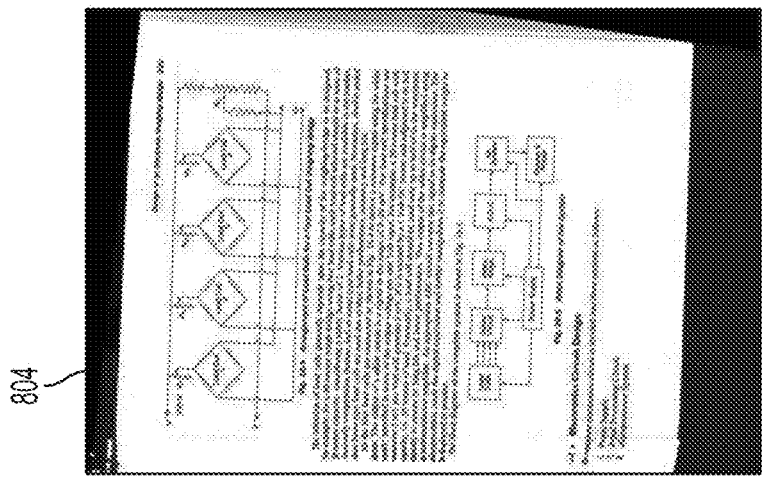
FIGS. 8A-8B show a cropped left side and a cropped right side of a second image, in accordance with an embodiment of the present disclosure.
Figure 8A:
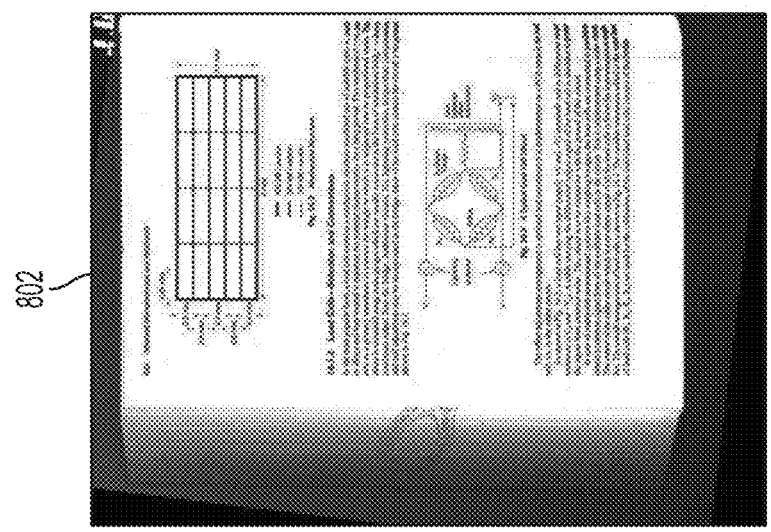

FIGS. 8A-8B show a cropped left side 802 and a cropped right side 804 of a second image, in accordance with an embodiment of the present disclosure. The second image is the shadow removed image 714 as discussed with reference to FIG. 7G. Further, the multi-function device 302 may divide the second image into the cropped left side 802 and the cropped right side 804. The multi-function device 302 (or the image processing device 310) is configured to correct a skewed orientation of each of the cropped left side 802 and the cropped right side 804. In some embodiments, the left side 802 and the right side 804 have different skew due to an uneven page distribution of both sides 802-804.

Figure 9A:
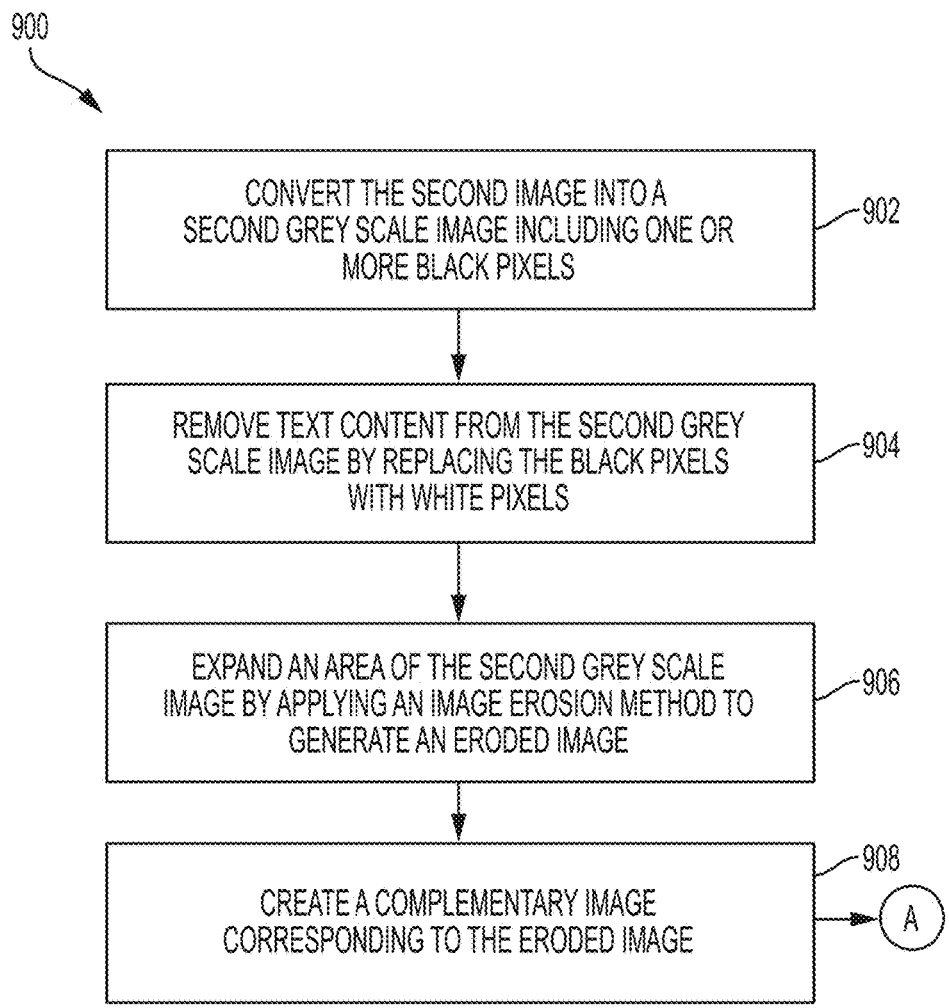
FIGS. 9A-9B represent a flowchart for correcting a skewed orientation of a scanned image, in accordance with an embodiment of the present disclosure.
Figure 9B:
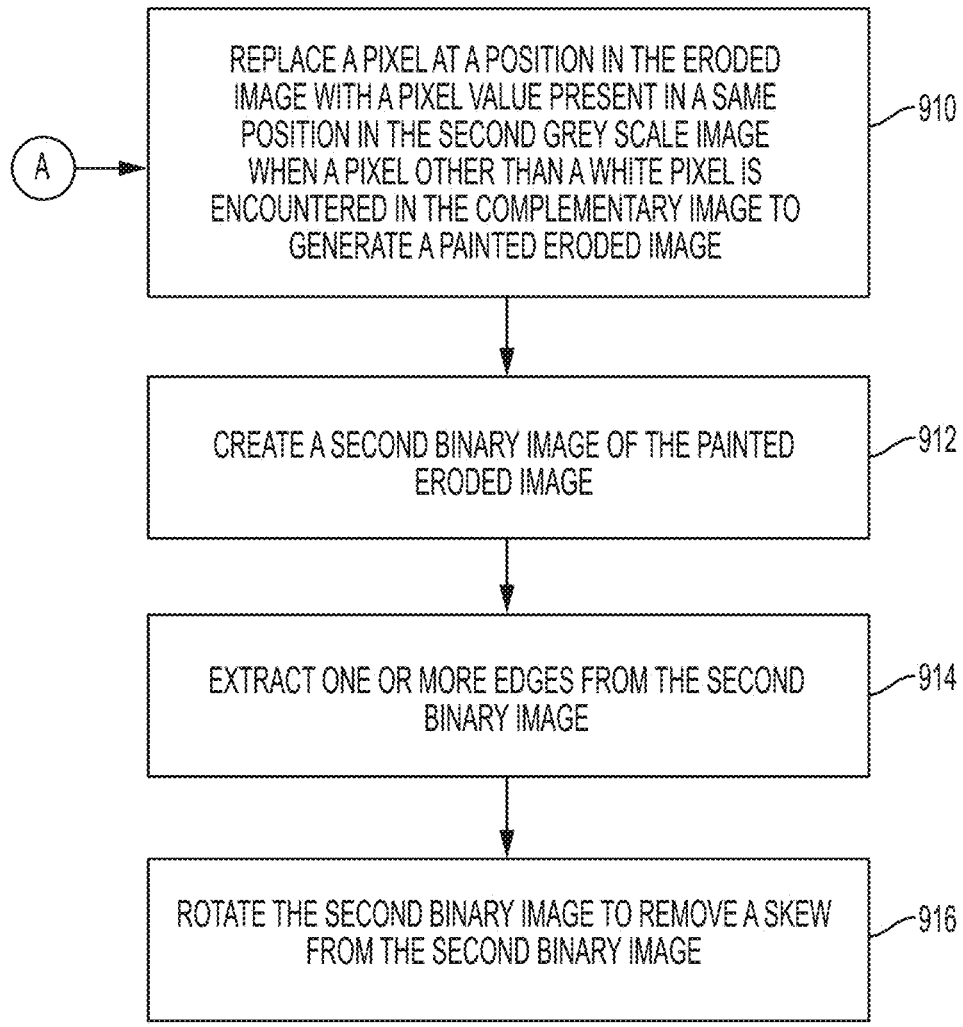

FIGS. 9A-9B is a flowchart illustrating a method 900 for correcting a skewed orientation of a scanned image, in accordance with an embodiment of the present disclosure. As discussed with reference to FIG. 3, the multi-function device 302 is configured to re-position shadow region present in a scanned image such that the shadow region becomes perpendicular to a base of the scanned image such as the first image. As discussed with reference to the FIGS. 7A-7F, the multi-function device 302 is configured to detect and remove the shadow region from the first image and generate a shadow removed image 714 including a left side and a right side. In some embodiments, the left side and the right side have different skew due to an uneven page distribution of both sides. The multi-function device 302 may crop the left side and the right side from the shadow removed image 714 to generate the cropped left side 802 and the cropped right side 804. The multi-function device 302 includes multiple in-built devices as shown in FIG. 3. The multi-function device 302 is configured to correct a skewed orientation of each of a cropped left side and a cropped right side of the second image. The following blocks 902-916 are performed on each of the cropped left side 802 and the cropped right side 804 of the shadow removed image 714 or the second image 714 for correcting the skewed orientation.

At 902, the second image, for example the cropped left side 802 of the shadow removed image 714, is converted into a second grey scale image including one or more black pixels. In some embodiments, the image processing device 310 converts the second image into the second grey scale image. At 904, text content is removed from the second grey scale image by replacing the one or more black pixels with one or more white pixels. In some embodiments, the image processing device 310 removes the text content from the second grey scale image by replacing the one or more black pixels with the one or more white pixels by applying a flood fill operation.

Then at 906, an image erosion method is applied for expanding an area of the second grey scale image to generate an eroded image. In some embodiments, the image processing device 310 expands the area of the second grey scale image by applying the image erosion method to generate the eroded image.

Thereafter at 908, a complimentary image corresponding to the eroded image is created. In some embodiments, the image processing device 310 creates the complimentary image. At 910, when a pixel other than a white pixel is encountered in the complementary image, then a pixel at a position in the eroded image is replaced with a pixel value present in a same position in the second grey scale image to generate a painted eroded image. In some embodiments, the image processing device 310 performs the 910. Then at 912, a second binary image of the painted eroded image is created. In some embodiments, the image processing device 310 creates the second binary image.

Further at 914, one or more edges from the second binary image are extracted. In some embodiments, the image processing device 310 extracts the one or more edges by applying a canny operator. In some embodiments, the canny operator is an edge detection operator that uses a multi-stage method or algorithm for detecting edges in scanned images. First of all the painted eroded image is smoothed by Gaussian convolution. Then a simple 2-D first derivative operator for example, but not limited to Roberts Cross, is applied to the smoothed image to highlight regions of the image with high first spatial derivatives. Edges may give rise to ridges in the gradient magnitude image. The top of these ridges may then be tracked and all pixels that are not actually on the ridge top are set to zero so as to give a thin line in the output, a process known as non-maximal suppression. The tracking process exhibits hysteresis controlled by two thresholds: "T1" and "T2," where T1>T2. Further, tracking may only begin at a point on a ridge higher than "T1." The tracking may then continue in both directions out from that point until the height of the ridge falls below "T2." This hysteresis may help to ensure that noisy edges are not broken up into multiple edge fragments.

Then at 916, the second binary image is rotated to remove a skew from the second binary image. In some embodiments, a Hough line transformation method is applied for rotating the second binary image by considering a maximum returned degree for rotating the second binary image. In some embodiments, the image processing device 310 applies the Hough line transformation method for rotating the second binary image and removing the skew from the second binary image by considering a maximum returned degree.

The above disclosed blocks 902-914 are performed for the cropped left side 802 and then is repeated for the cropped right/second side. Likewise, the skewed orientation of the cropped right side 804 of the second image is corrected. Thereafter, a skew corrected left side image and a skew corrected right side image is merged to generate a corrected scanned image as described in FIG. 11.

FIGS. 10A-10I show a scanned image at various stages of correcting a skewed orientation of the scanned image, in accordance with an embodiment of the present disclosure. The FIGS. 10A-10I show the scanned image after execution of each of the blocks 902-916 as discussed with reference to FIGS. 9A-9B.

Figure 10B:
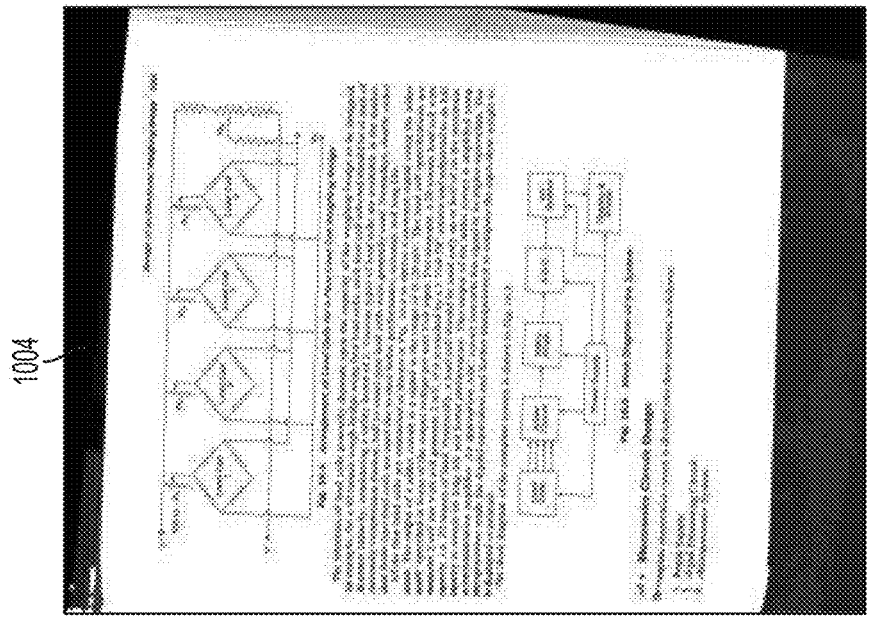
FIGS. 10A-10I show a scanned image at various stages of correcting a skewed orientation of the scanned image, in accordance with an embodiment of the present disclosure.
Figure 10A:
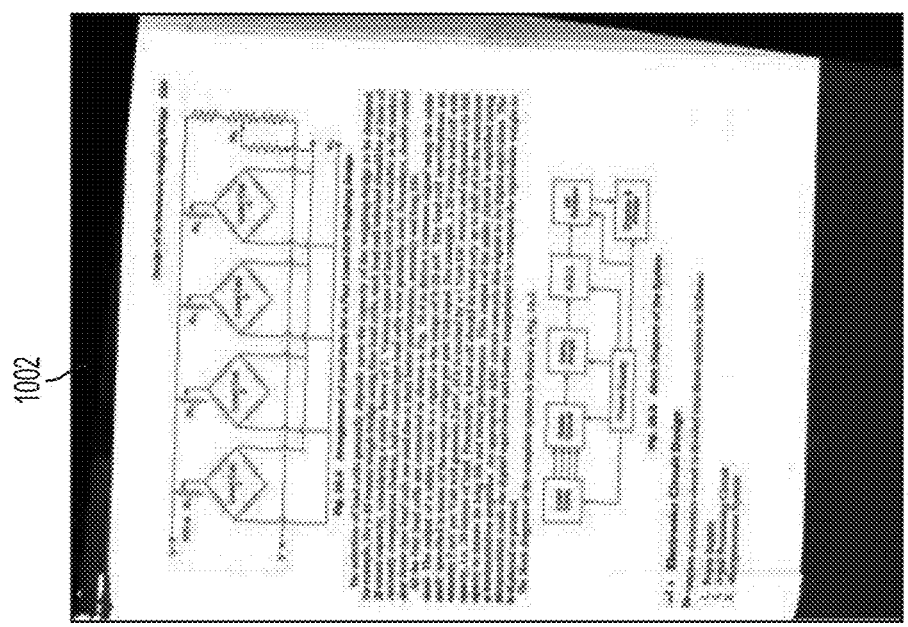

FIG. 10A shows a cropped image 1002 for example, the cropped left side 802 of the shadow removed image 714 (or the second image) that is an input for skew correction. The cropped left side 802 is converted to a second grey scale image 1004 as described in the 902 of FIG. 9A. The converted second grey scale image 1004 is shown in FIG. 10B. A flood fill operation is applied on the second grey scale image as described in 904. An image 1006 after applying the flood fill operation is shown in FIG. 10C.

Figure 10D:
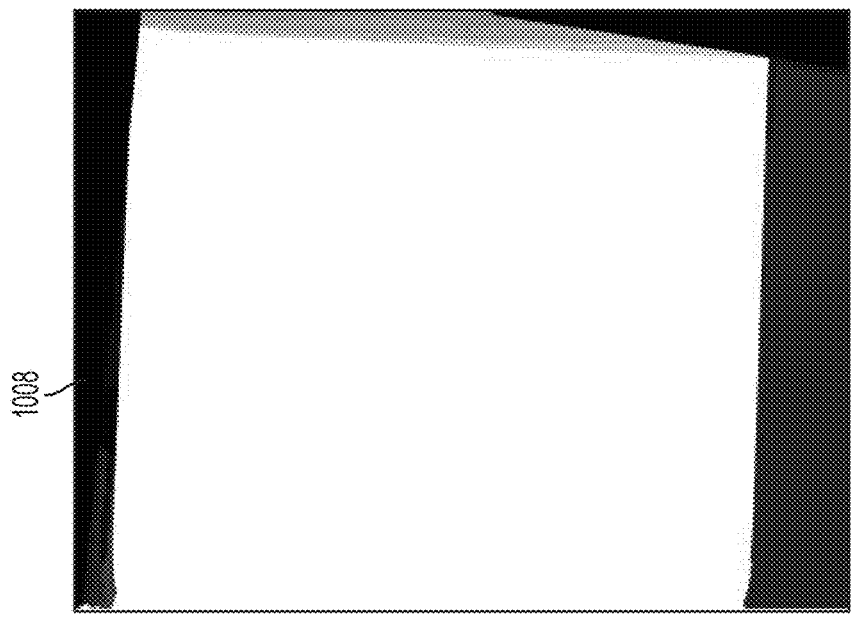
Figure 10C:
Figure 10E:
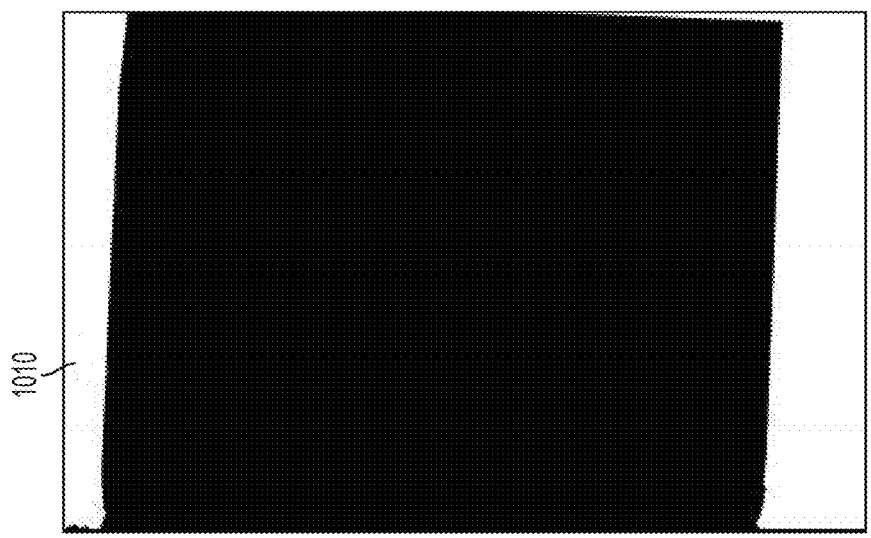
Figure 10F:
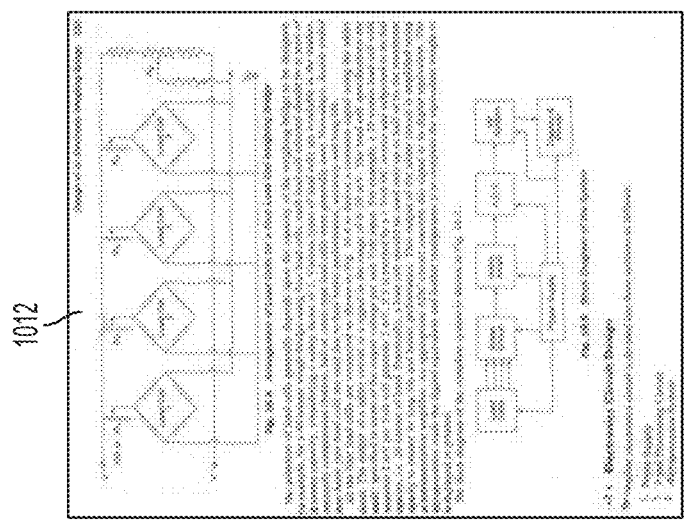

Then an image erosion method is applied on the image 1006 for expanding an area of the second grey scale image 1006 to generate an eroded image 1008 as shown in FIG. 10D. A complementary image 1010 corresponding to the eroded image 1008 is created as shown in the FIG. 10E.

In the complementary image 1010, corner noise is removed. When a pixel other than a white pixel is encountered in the complementary image 1010, then a pixel at a position in the eroded image 1008 is replaced with a pixel value present in a same position in the second grey scale image 1004 to generate a painted eroded image 1012 as shown in the FIG. 10F.

Figure 10G:
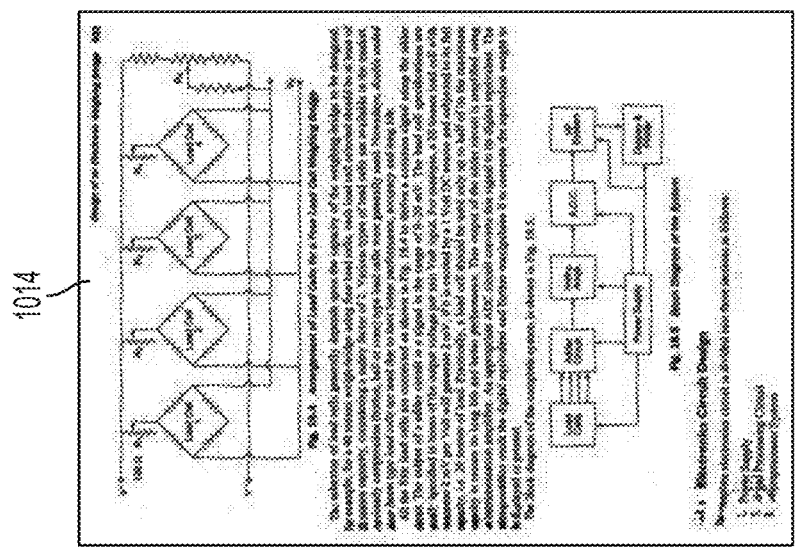
Figure 10H:

A second binary image 1014 of the painted eroded image 1012 is created as shown in FIG. 10G. One or more edges from the second binary image 1014 are extracted to result an edge image 1016 as shown in FIG. 10H. The edges are extracted by the image processing device 310 by applying a canny operator as explained in detail with reference to FIGS. 9A-9B.

Figure 10I:
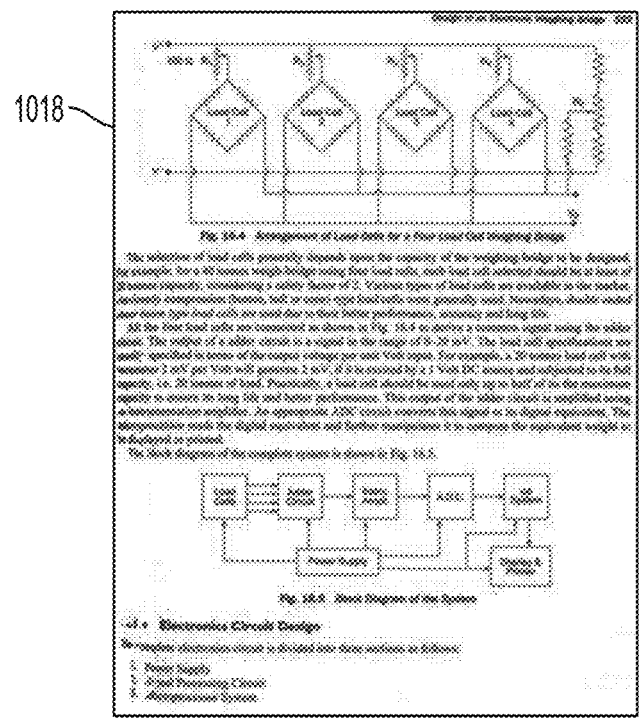

FIG. 10I shows a skew corrected image 1018. To remove skew, the Hough line transformation method is applied by the image processing device 310 and a maximum returned degree is considered to rotate the edge image 1016. Likewise, the skewed orientation of the cropped right side 804 of the second image is corrected. Thereafter, a skew corrected left side image, i.e., the image 1018 and a skew corrected right side image are merged by the image processing device 310 to generate a corrected scanned image as described in FIG. 11.

Figure 11:
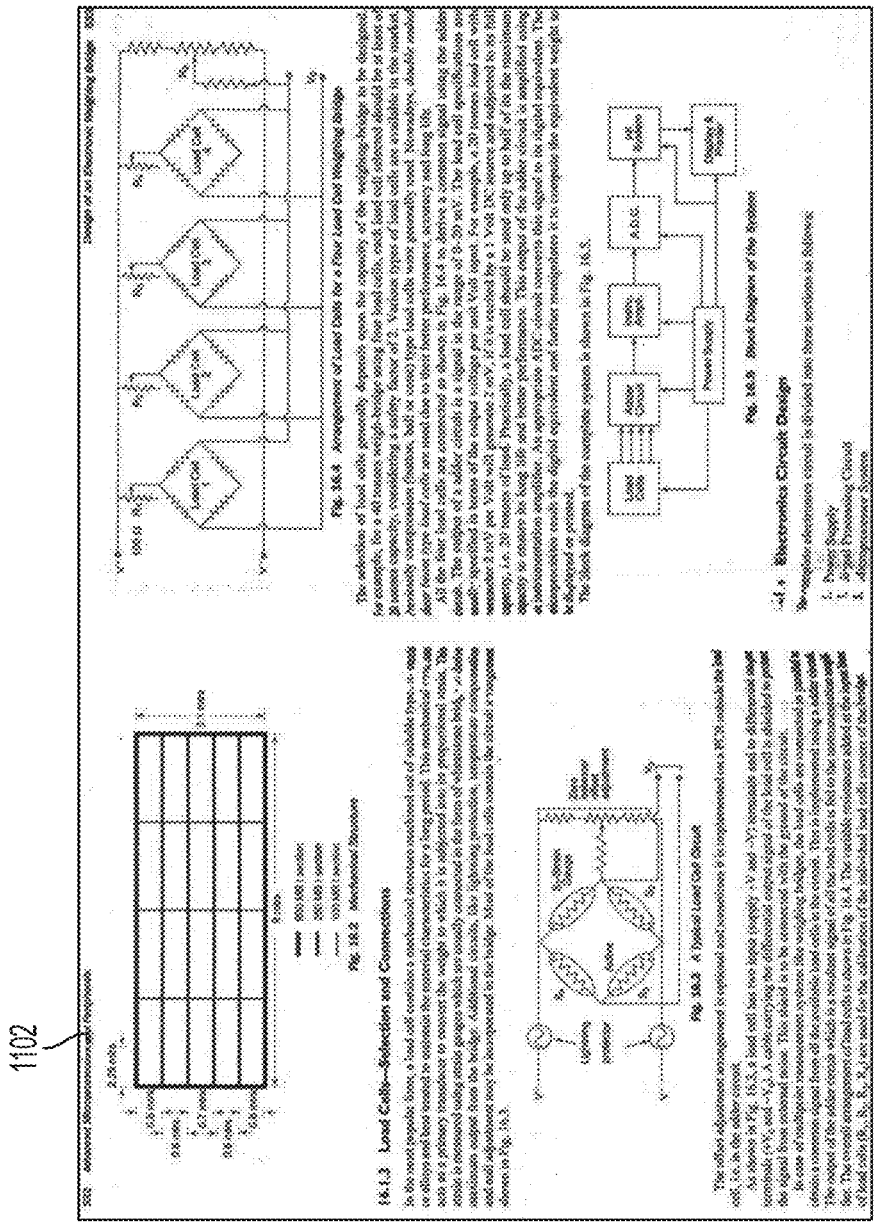
FIG. 11 shows an auto corrected scanned image, in accordance with an embodiment of the present disclosure.

FIG. 11 shows an auto corrected scanned image 1102, in accordance with an embodiment of the present disclosure. While merging a skew corrected left side image, i.e., the image 1018, and a skew corrected right side image, one of the images may come little up and the other page may come little down due to presence of different skew in the second image or the original first image. Therefore, to remove the skew in the merged image, the image processing device 310 may detect the presence of content in skew corrected image of any side, for example, a left side 1018, and may leave a same height as blank in other side of the image. The image 1102 is a final skew and alignment corrected image.

Figure 12B:
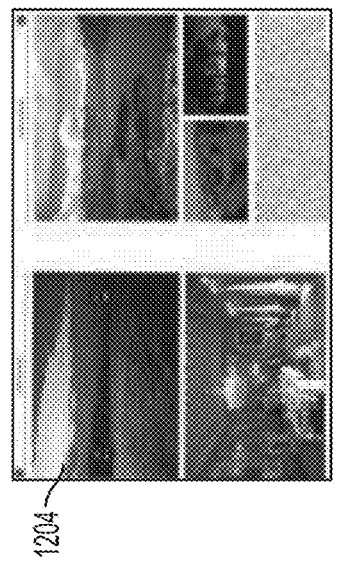
FIG. 12B shows the exemplary scanned image after auto correction and removal of the shadow effects.
Figure 12D:
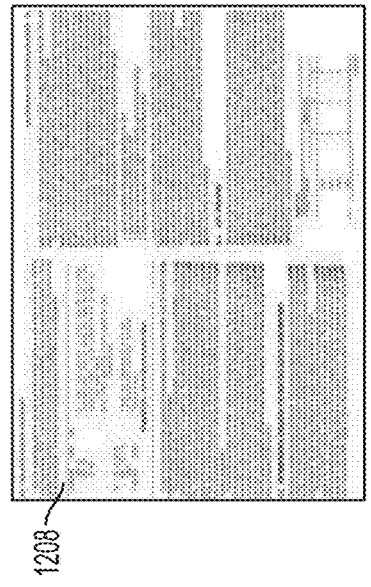
FIG. 12D shows the exemplary scanned image after auto correction and removal of the shadow effects.
Figure 12A:
FIG. 12A shows an exemplary scanned image with shadow effects (or defects).

FIG. 12A shows an exemplary scanned image 1202 with shadow effects (or defects). The disclosed multi-function device 302 is configured to remove the shadow effects from the scanned image 1202.

FIG. 12B shows an exemplary scanned image 1204 after auto correction and removal of the shadow effects. The exemplary scanned image 1204 is generated by applying the disclosed methods of correcting shadow effects on the exemplary scanned document of FIG. 12A.

Figure 12C:
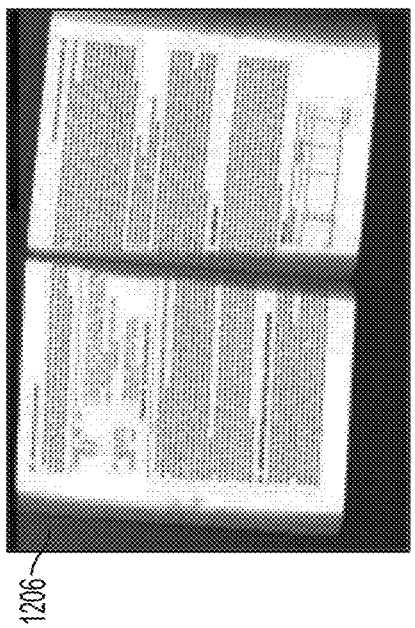
FIG. 12C shows an exemplary scanned image with shadow effects (or defects).

FIG. 12C shows another exemplary scanned image 1206 with shadow effects (or defects). The disclosed multi-function device 302 is configured to remove the shadow effects from the scanned image 1206.

FIG. 12D shows another exemplary scanned image 1208 after auto correction and removal of the shadow effects. The exemplary scanned image 1208 is generated by applying the disclosed methods of correcting shadow effects on the exemplary scanned image 1206 of FIG. 12C.

The disclosed multi-function devices and methods are used for providing undesired shadow removed scanned images of thick books like thick bound books.

Further, by using the presently disclosed multi-function devices and methods an ample amount of toner (or toner of the input output terminals like printer) is saved. Because considering the present behavior of users due to mis-calibration of thick bound books while scanning, infrequent noise patches (shadow regions) are observed in the scanned images that may raise an amount of toner to be used in the input output terminals while printing. In some scenarios, the book may not be placed properly on a scan bed of the MFD (or the scanner). Hence the shadow region may get introduced which may not be perpendicular to the center of the image. The disclosed methods and systems remove the shadow regions generated due to mis-calibration of the book. The disclosed methods and MFDs identify and remove only the noise patches i.e. the shadow regions, and hence may help in reducing the unnecessary usage of the toner.

The disclosed multi-function devices and methods may enable a user to scan pages of thick books and receive properly scanned images that are free from any of the shadow effects.

The presently disclosed methods and multi-function devices are well capable of identifying and removing only shades or shadows in all possible challenging scenarios that refer to removing shades even within text region.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "analyzing" or "scanning" or "displaying" or "recognizing" or "identifying" "or receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for automatically correcting a plurality of shadow effects present in a scanned image, comprising:

receiving, by a transceiving device, a first image comprising a colored twin-page scanned document, wherein the first image comprising at least one of a shadow region in a central part of the first image such that the shadow region is not perpendicular to the central part of the first image, at least one darker region caused at one or more borders of the first image, and distorted orientation with respect to a base of the first image;

re-positioning, by an image processing device, the shadow region present in the central part of the first image to generate a re-positioned first binary image such that the shadow region becomes perpendicular to the base of the first image;

detecting, by the image processing device, at least one shadow region in a central region of the re-positioned first binary image;

removing, by the image processing device, the detected at least one shadow region from the re-positioned first binary image to generate a second image comprising a left side and a right side; and correcting, by the image processing device, a skewed orientation of each of a cropped left side and a cropped right side of the second image.

2. The method of claim 1, wherein re-positioning the shadow region present in the central part of the first image further comprises:

converting, by the image processing device, the first image into a first grey scale image, wherein the first grey scale image comprises an eight-bit grey scale image;

converting, by the image processing device, the first grey scale image into a first binary image comprising a plurality of black pixels based on a grey threshold, the grey threshold depends on a nature of the first grey scale image;

removing, by the image processing device, content including text content from the first binary image by replacing the plurality of black pixels with a plurality of white pixels, wherein a flood fill operation is applied to remove the text content;

applying, by the image processing device, a dilation method for removing sporadic noise segments to generate a dilated image;

extracting, by the image processing device, one or more edges from the dilated image to generate an edge image;

determining, by the image processing device, a degree of rotation "θ" with respect to the base of the first grey scale image; and rotating, by the image processing device, the first image based on the degree of rotation "θ" to generate the re-positioned first binary image, wherein a maximum returned degree of rotation "θ" is considered for rotating the first image and making the shadow region perpendicular to the base.

3. The method of claim 2, wherein the degree of rotation "θ" is determined by applying a Hough line transformation method.

4. The method of claim 2, wherein correcting the skewed orientation of the second image further comprising:

for each of the cropped left side and the cropped right side of the second image:

converting a cropped side of the cropped left side and the cropped right side of the second image into a second grey scale image comprising one or more black pixels, wherein the cropped left side and the cropped right side have different skewed orientation;

removing text content from the second grey scale image by replacing the one or more black pixels with one or more white pixels, wherein a flood fill operation is applied for removing the text content;

generate an eroded image by expanding an area of the second grey scale image by applying an image erosion method;

creating a complementary image corresponding to the eroded image;

generate a painted eroded image replacing a pixel at a position in the eroded image with a pixel value present in a same position in the second grey scale image when a pixel other than a white pixel is encountered in the complementary image;

creating a second binary image of the painted eroded image;

extracting one or more edges from the second binary image; and rotating the second binary image to remove a skew from the second binary image.

5. The method of claim 4, wherein the second binary image is rotated for removing the skew by applying a Hough line transformation method, wherein a maximum returned degree is considered for rotating the second binary image.

6. The method of claim 4, wherein the one or more edges are extracted from the second binary image by applying a canny operator.

7. A multi-function device for automatically correcting a plurality of shadow effects present in a scanned image, comprising:

a transceiving device configured to receive a first image comprising a colored twin-page scanned document, wherein the first image comprising at least one of a shadow region in a central part of the first image such that the shadow region is not perpendicular to the central part of the first image, at least one darker region caused at one or more borders of the first image, and distorted orientation with respect to a base of the first image; and an image processing device configured to:
re-position the shadow region in the central part of the first image to generate a re-positioned first binary image such that the shadow region becomes perpendicular to the base of the first image;
detect at least one shadow region in a central region of the re-positioned first binary image;
remove the detected at least one shadow region from the re-positioned first binary image to generate a second image comprising a left side and a right side; and
correct a skewed orientation of each of a cropped left side and a cropped right side of the second image.

8. The multi-function device of claim 7, wherein the image processing device is further configured to:

convert the first image into a first grey scale image, wherein the first grey scale image is an eight-bit grey scale image;

convert the first grey scale image into a first binary image comprising a plurality of black pixels based on a grey threshold, the grey threshold depends on a nature of the first grey scale image;

remove content including text content from the first binary image by replacing the plurality of black pixels with a plurality of white pixels, wherein a flood fill operation is applied to remove the text content;

apply a dilation method for removing sporadic noise segments to generate a dilated image;

extract one or more edges from the dilated image to generate an edge image;

determine a degree of rotation "θ" with respect to the base of the first grey scale image, wherein the degree of rotation "θ" is determined by applying a Hough line transformation method; and rotate the first image based on the degree of rotation "θ" to generate the re-positioned first binary image, wherein a maximum returned degree of rotation "θ" is considered for rotating the first image and making the shadow region perpendicular to the base.

9. The multi-function device of claim 7, wherein for each of the cropped left side and the cropped right side of the second image, the image processing device is configured to:

convert the second image into a second grey scale image comprising one or more black pixels;

remove text content from the second grey scale image by replacing the one or more black pixels with one or more white pixels, wherein a flood fill operation is applied for removing the text content;

expand an area of the second grey scale image by applying an image erosion method to generate an eroded image;

create a complementary image corresponding to the eroded image;

generate a painted eroded image by replacing a pixel at a position in the eroded image with a pixel value present in a same position in the second grey scale image when a pixel other than a white pixel is encountered in the complementary image;

create a second binary image of the painted eroded image;

extract one or more edges from the second binary image; and rotate the second binary image to remove a skew from the second binary image.

10. The multi-function device of claim 9, wherein the image processing device is configured to rotate the second binary image for removing the skew by applying a Hough line transformation method, wherein a maximum returned degree is considered for rotating the second binary image.

11. The multi-function device of claim 9, wherein the image processing device is configured to extract the one or more edges from the second binary image by applying a canny operator.

12. A method for automatically correcting a plurality of shadow effects present in a scanned image, comprising:

receiving a first image comprising a colored twin-page scanned document, wherein the first image comprises at least one of a shadow region in a central part of the first image such that the shadow region is not perpendicular to the central part of the first image, at least one darker region caused at one or more borders of the first image, and distorted orientation with respect to a base of the first image;

converting the first image into a first grey scale image, wherein the first grey scale image comprises an eight-bit grey scale image;

converting the first grey scale image into a first binary image comprising a plurality of black pixels based on a grey threshold, the grey threshold depends on a nature of the first grey scale image;

removing text content from the first binary image by replacing the plurality of black pixels with a plurality of white pixels;

applying a dilation method for removing sporadic noise segments to generate a dilated image;
extracting one or more edges from the dilated image to generate an edge image;
determining a degree of rotation "θ" with respect to the base of the first grey scale image, wherein a Hough line transformation method is applied for determining the degree of rotation "θ";
rotating the first image based on the degree of rotation "θ" to generate the re-positioned first binary image, wherein a maximum returned degree of rotation "θ" is considered for rotating the first image and making the shadow region perpendicular to the base;
detecting at least one shadow region in a central region of the re-positioned first binary image;
removing the detected at least one shadow region from the re-positioned first binary image to generate a second image comprising a left side and a right side; and
correcting a skewed orientation of each of a cropped left side and a cropped right side of the second image.

13. The method of claim 12, wherein correcting the skewed orientation of the second image further comprising:
for each of the cropped left side and the cropped right side of the second image:
converting a cropped side of the cropped left side and the cropped right side of the second image into a second grey scale image comprising one or more black pixels, wherein the cropped left side and the cropped right side have different skewed orientation;
removing text content from the second grey scale image by replacing the one or more black pixels with one or more white pixels, wherein a flood fill operation is applied for removing the text content;
expanding an area of the second grey scale image by applying an image erosion method to generate an eroded image;
creating a complementary image corresponding to the eroded image;
generating a painted eroded image by replacing a pixel at a position in the eroded image with a pixel value present in a same position in the second grey scale image when a pixel other than a white pixel is encountered in the complementary image;
creating a second binary image of the painted eroded image;
extracting one or more edges from the second binary image; and
rotating the second binary image to remove a skew from the second binary image.

14. The method of claim 13, wherein the second binary image is rotated for removing the skew by applying a Hough line transformation method, wherein a maximum returned degree is considered for rotating the second binary image.

15. The method of claim 13, wherein the one or more edges are extracted from the second binary image by applying a canny operator.

16. The method of claim 12, wherein the text content is removed from the first binary image by applying a flood fill operation.

17. A multi-function device for automatically correcting a plurality of shadow effects present in a scanned image, comprising:
a transceiving device configured to receive a first image comprising a colored twin-page scanned document, wherein the first image comprises at least one of a shadow region in a central part of the first image such that the shadow region is not perpendicular to the central part of the first image, at least one darker region caused at one or more borders of the first image, and distorted orientation with respect to a base of the first image;
an image processing device configured to:
convert the first image into a first grey scale image, wherein the first grey scale image comprises an eight-bit grey scale image;
convert the first grey scale image into a first binary image comprising a plurality of black pixels based on a grey threshold, the grey threshold depends on a nature of the first grey scale image;
remove text content from the first binary image by replacing the plurality of black pixels with a plurality of white pixels, wherein a flood fill operation is applied for removing text content from the first binary image;
apply a dilation method for removing sporadic noise segments to generate a dilated image;
extract one or more edges from the dilated image to generate an edge image;
determine a degree of rotation "θ" with respect to the base of the first grey scale image by applying a Hough line transformation method;
rotate the first image based on the degree of rotation "θ" to generate the re-positioned first binary image, wherein a maximum returned degree of rotation "θ" is considered for rotating the first image and making the shadow region perpendicular to the base;
detect at least one shadow region in a central region of the re-positioned first binary image;
remove the detected at least one shadow region from the re-positioned first binary image to generate a second image; and
correct a skewed orientation of each of a cropped left side and a cropped right side of the second image.

18. The multi-function device of claim 17, wherein the image processing device is further configured to correct the skewed orientation of each of the cropped left side and the cropped right side of the second image by:
converting a cropped side of the cropped left side and the cropped right side of the second image into a second grey scale image comprising one or more black pixels;
removing text content from the second grey scale image by replacing the one or more black pixels with one or more white pixels in the second grey scale image, wherein a flood fill operation is applied for removing the text content from the second grey scale image;
expanding an area of the second grey scale image by applying an image erosion method to generate an eroded image;
creating a complementary image corresponding to the eroded image;
generating a painted eroded image by replacing a pixel at a position in the eroded image with a pixel value present in a same position in the second grey scale image when a pixel other than a white pixel is encountered in the complementary image;
creating a second binary image of the painted eroded image;
extracting one or more edges from the second binary image; and
rotating the second binary image to remove a skew by applying a Hough line transformation method, wherein a maximum returned degree is considered for rotating the second binary image.

19. The multi-function device of claim 18, wherein the one or more edges are extracted from the second binary image by applying a canny operator.

20. The multi-function device of claim 18, wherein the second binary image is rotated for removing the skew by applying a Hough line transformation method, wherein a maximum returned degree is considered for rotating the second binary image.

* * * * *